(12) United States Patent
Meyers et al.

(10) Patent No.: US 7,847,234 B2
(45) Date of Patent: Dec. 7, 2010

(54) METHOD AND SYSTEM FOR OBSERVING A SUBJECT AT A FIRST LOCATION BASED UPON QUANTUM PROPERTIES MEASURED AT A SECOND LOCATION

(75) Inventors: Ronald Everett Meyers, Columbia, MD (US); Keith Scott Deacon, Columbia, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 146 days.

(21) Appl. No.: 12/343,384

(22) Filed: Dec. 23, 2008

(65) Prior Publication Data

US 2009/0194702 A1   Aug. 6, 2009

Related U.S. Application Data

(63) Continuation-in-part of application No. 12/330,401, filed on Dec. 8, 2008, now Pat. No. 7,812,303, and a continuation-in-part of application No. 10/900,351, filed on Jul. 28, 2004, now Pat. No. 7,536,012.

(60) Provisional application No. 60/493,107, filed on Aug. 6, 2003, provisional application No. 60/992,792, filed on Dec. 6, 2007.

(51) Int. Cl.
*H01J 40/14* (2006.01)
(52) U.S. Cl. .................................. 250/225; 250/221
(58) Field of Classification Search .............. 250/221, 250/222.1, 225, 214 R, 214.1, 559.4; 356/301, 356/317, 318, 322, 327, 453, 487, 491, 367, 356/368; 380/44, 283, 256, 278
See application file for complete search history.

(56) References Cited

U.S. PATENT DOCUMENTS 5,515,438 A    5/1996   Bennett et al.

(Continued)

OTHER PUBLICATIONS

Walton, et al., "Performance of Photon-Pair Quantum Key Distribution Systems," (2001) .Journal of Modern Optics, vol. 48, Issue 14 Nov. 2001 , pp. 2055-2063.

(Continued)

*Primary Examiner*—Que T Le
(74) *Attorney, Agent, or Firm*—Lawrence E. Anderson

(57) ABSTRACT

A preferred embodiment comprises a method and system for (a) detecting objects or targets which may or may not be nonreflective to electromagnetic radiation, and/or (b) generating an image of a subject or area, comprising generating an entangled photon pair beam; splitting the entangled photon pair beam into first and second parts; the first parts being directed in a first direction towards a first location, and the second parts being received into a measuring device; measuring the physical characteristics of the conjugate second parts to determine whether or not the first parts have encountered the presence or absence of an object at the first location in combination with the time that the first part takes to enter the first location. The method and system incorporate a photon beam in a reference path that never directly interacts with the object yet is determinative of presence or absence of an object at the first location. The splitting of the entangled photon pair beam occurs prior to the first parts being absorbed by said object, and the measuring of the characteristics of the conjugates occurs subsequent to the splitting of the entangled photon beam.

11 Claims, 24 Drawing Sheets

U.S. PATENT DOCUMENTS

| | | | |
|---|---|---|---|
| 5,675,648 | A | 10/1997 | Townsend |
| 5,999,285 | A | 12/1999 | Brandt et al. |
| 6,272,224 | B1 | 8/2001 | Mazourenko et al. |
| 6,289,104 | B1 | 9/2001 | Patterson et al. |
| 6,424,665 | B1 | 7/2002 | Kwat et al. |
| 6,444,999 | B1 | 9/2002 | Tomita |
| 6,748,083 | B2 | 6/2004 | Hughes et al. |
| 6,864,501 | B2 | 3/2005 | Shields et al. |
| 6,895,091 | B1 | 5/2005 | Elliott et al. |
| 7,116,415 | B2 * | 10/2006 | Iuliano ................ 356/301 |
| 7,242,774 | B1 | 7/2007 | Elliott et al. |
| 2001/0055389 | A1 | 12/2001 | Hughes et al. |
| 2002/0097874 | A1 | 7/2002 | Foden et al. |
| 2003/0112970 | A1 | 6/2003 | Mitra |

OTHER PUBLICATIONS

Nasr et al. "Biphoton Focusing for Two-photon Excitation," Jan. 17, 2002, The American Physical Society, p. 1-6.

W. Tittel, et al. "Violations of Bell Inequalities by Photons More Than 10 km Apart,", Phys Rev. Lett., 81, pp. 3563-3566 (1998).

U.S. Appl. No. 60/456,871 to Elliott, et al., filed Mar. 21, 2003, entitled "Quantum Key Distribution Apparatus Based on Entangled Photons."

B.M. Joel, "Spatial Correlations of Spontaneously Down-converted Photon Pairs Detected with a Single-Photon Sensitive Camera," Optics Express, 3, pp. 81-87 (1998).

A.V. Sergienko, et al. "Two-photon Geometric Optical Imaging and Quantum 'CryptoFAX'" (1996) SPIE vol. 2799, pp. 164-171 (1996) Atomic and Quantum Optics: High-Precision Measurements, St. Petersburg, Russia, SPIE.

Artur K. Ekert, Quantum Cryptography Based on Bell's Theorem, Physical Review Letters, vol. 67, No. 6, Aug. 5, 1991.

J.D. Fransen, "Bell Inequality for Position and Time," Physical Review Letters, vol. 62, No. 19, May 8, 1989.

N. Gisin, et al., "Quantum Cryptography and Long Distance Bell Experiments: How to Control Decoherence," University of Geneva, Geneva Switzerland, Jan. 15, 1999.

G. Ribordy, et al., "Long-Distance Entanglement-based Quantum Key Distribution," Physical Review A. vol. 63, 012309-1-12. Dec. 13, 2000.

D.S. Naik, "Entangled State Quantum Cruptography: Eavesdropping on the Ekert Protocol," Physical Review Letters, vol. 84, No. 20, pp. 4733-4736.

T. Jennewein, "Quantum Cryptography with Entangled Photons," Physical Review Letters, vol. 84, No. 20, pp. 4729-4732.

C. Elliott, "Buiilding the Quantum Network," New Journal of Physics 4, 46, Jul. 12, 2002.

G. Jaeger & A. Sergienko, "Multi-photon Quantum lnferometry," Progress in Optics 42, Chapter 5, pp. 277-324 (2001).

Award/Contract No. F30602-01-C-0170, Effective Date Aug. 10, 2001, Between Air Force Research Laboratory and BBNT Solutions LLC.

Shelton, et al., "Degenerate Noncollinear Emission from a Type I Collinear Parametric Oscillator," Jul. 2, 2001, vol. 9, No. 1, Optics Express 16-23.

Spiller, "Quantum Information Processing: Cryptography, Computation, and Teleportation," Proceedings of the IEEE, Rev. Mod. Physics, Vo. 74, No. 1, Jan. 2002.

Jennewein, Thomas, et al., "Experimental Nonlocality Proof of Quantum Teleportation and Entanglement Swapping," Physical Review Letters vol. 88, No. 1, (Jan. 2002), 124-141.

Jennewein, Thomas Daniel, Quantum Communication and Teleportation Experiments using Entangled Photon Pairs (Dissertation zur Erlangung des Grades) "Doktor der Naturwissenschaften" Jun. 2002.

Koashi, et al. "Probabilistic Manipulation of Entangled Photons" Physical Review A. vol. 63, 030301-1-4.

Roisse, et al. "Walk-off and Phase-compensated Resonantly Enhanced Frequency-doubling of Picosecond Pulses Using Type II Nonlinear Crystal," Appl. Phys. B 69 25-27 (1999).

Gisin, Nicholas, et al. "Quantum Cryptography," *Review of Modern Physics*, vol. 74, Jan. 2002, pp. 145-196.

Bennett, Charles H. et al., "Purification of Noisy Entanglement and Faithful Teleportation via Noisy Channels," Physical Review Letters, vol. 76, No. 5, Jan. 29, 1996, pp. 722-725.

J.D. Fransen, "Operational System for Quantum Cryptography," Electronics Letters, Feb. 2, 1995, vol. 31, No. 3, p. 232-4.

J.D. Franson, et al, Quantum Cryptography Using Optical Fibers, Applied Optics, (1994) vol. 33, No. 14, pp. 2949-2954.

B.C. Jacobs, "Quantum Cryptography in Free Space," Nov. 15, 1996, Optics Letters, vol. 21, No. 22, p. 1854-1856.

Hughes, Rlchard, "Practical Quantum Key Distribution Over a 48 km Optical Fiber Network," by RG, Hughes, et al., [ ] J, Mod, OPT 47, 533-47 (2000).

Walton, Zachary, et al., "One-Way Entangled-Photon Autocompensating Quantum Cryptography," J Physical Review A v, 67, 052309 (2003).

Bennett, Charles H. et al., "Quantum Cryptography Using Any Two Nonorthogonal States" Physical Review Letters, vol. 68. No. 21, May 25, 1992, pp. 3121-3124.

Barbosa, et al., "Secure Communication Using Mesoscopic Coherent States, Apr. 21 2003, arXiv:quant-ph/0212018v2., Phys, Rev, Lett" 90, 227901 (2003).

Al. Migdall, "Taylorlng Single and Multiphoton Probabilities of a Single Photon On-Demand Source," by [ ] Phys, Rev, A, 66, 053805 (2002).

Hughes, et al. "Free Space Quantum Distribution in Daylight," J, Mod, OPT 47, 549-562 (2000).

D.S. Nak, et al. "Entangled State Quantum Cryptography: Eavesdropping on the Ekert Protocol," by Phys, Rev, Lett, 84, 4733 (2000).

Bennett, Charles, "Purification of Noisy Entanglement and Faithful Teleportation Via Noisy Channels," Phys. Rev. Lett., 76, No. 5, Jan. 29, 1996, pp. 722-725.

Shih, et al "Two-Photon Geometric Optical Imaging and Quantum Cypto-FAX:" SPIE [ ] Proceedings, vol. 2799. pp. 164-171 (1996).

Jost, B.M. "Spatial Correlations of Spontaneously Down-Converted Photon Pairs Detected With a Single-Photon Sensitive CCD Camera," Optics Express, 3, pp. 81-87 (1998).

* cited by examiner

FIGURE 1 Prior Art per Pittman, et.al.

Fig. 3 Prior Art per Gatti et.al.

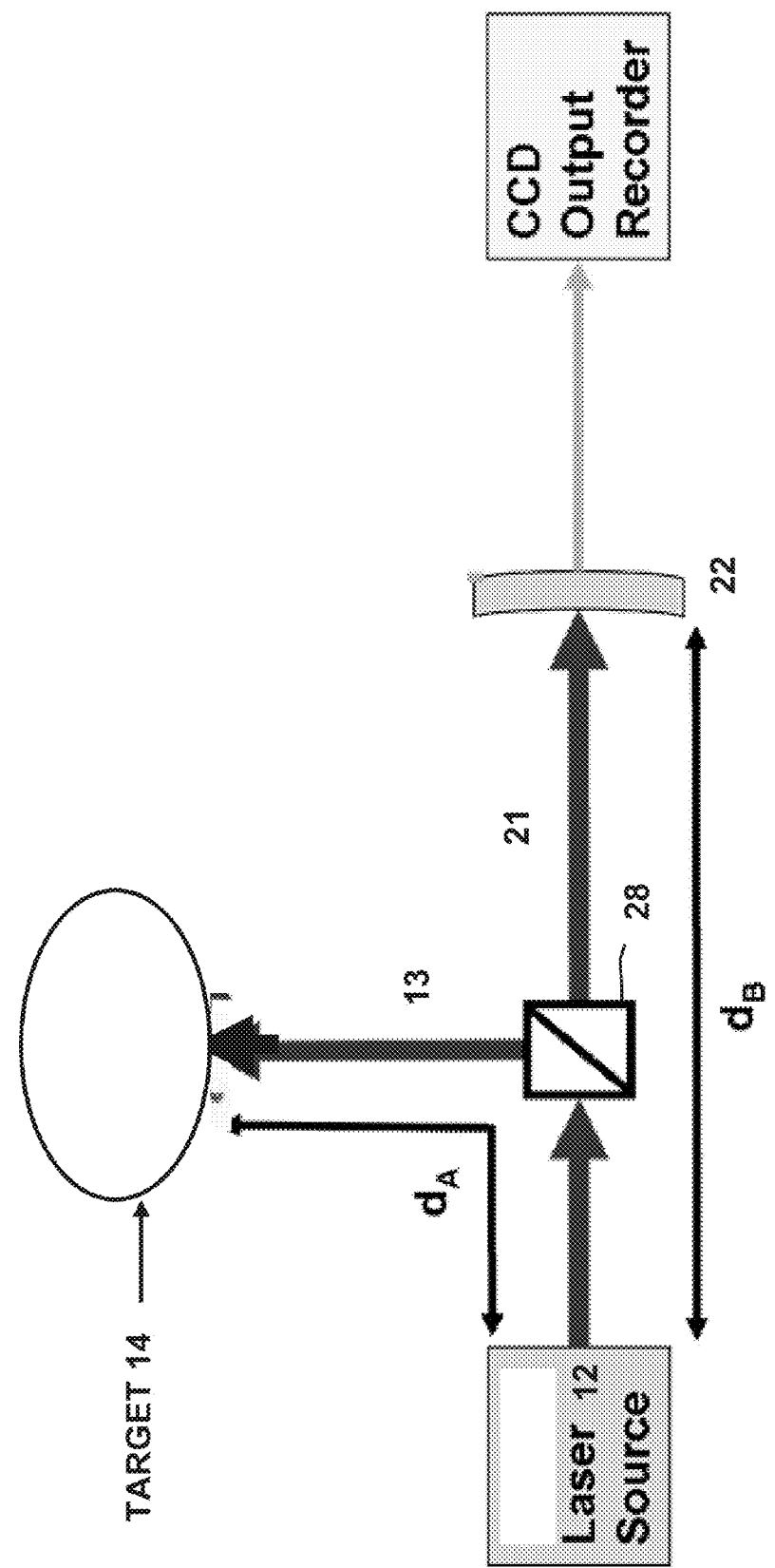

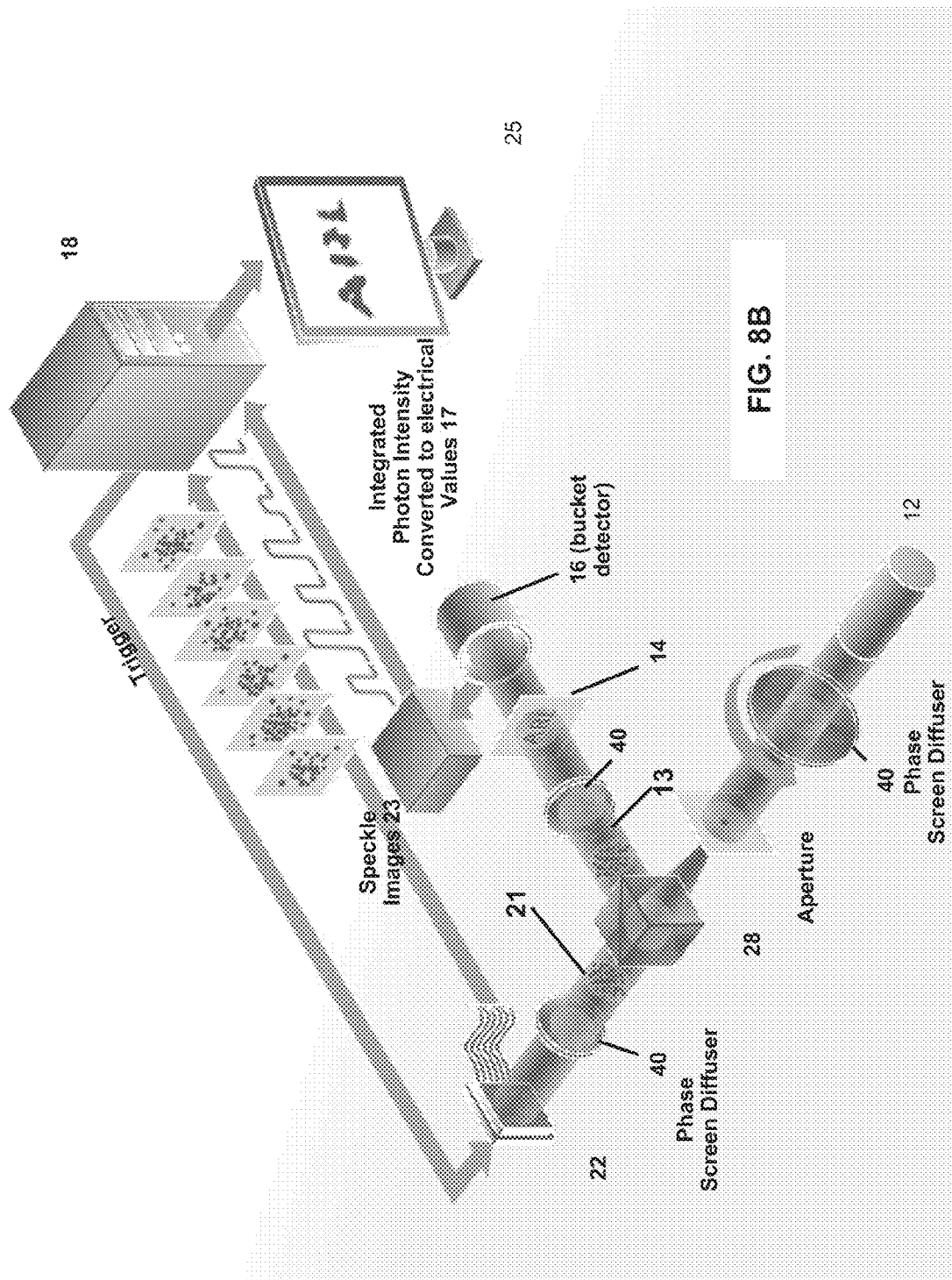

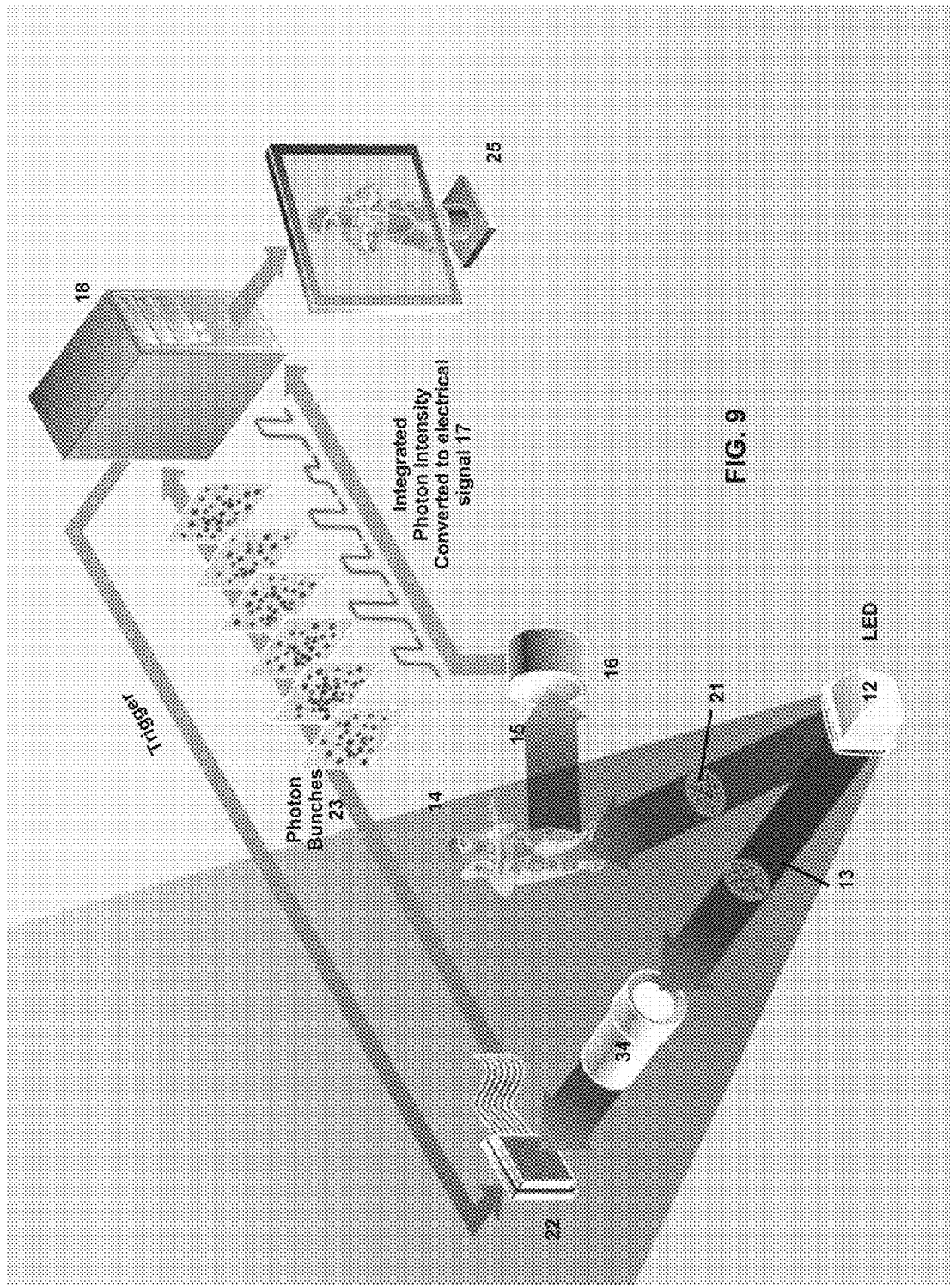

Correlates to FIG. 1 of U.S. Application No. 10/900,351

Correlates to FIG. 2 of U.S. Application No. 10/900,351

Correlates to FIG. 3 of U.S. Application No. 10/900,351

Correlates to FIG. 5 of U.S. Application No. 10/900,351

METHOD AND SYSTEM FOR OBSERVING A SUBJECT AT A FIRST LOCATION BASED UPON QUANTUM PROPERTIES MEASURED AT A SECOND LOCATION

CROSS-REFERENCE TO RELATED APPLICATIONS

This application claims priority of U.S. patent application Ser. No. 12/330,401, filed Dec. 8, 2008, which claims priority to U.S. Provisional Patent Application Ser. No. 60/993,792 filed Dec. 6, 2008; which are both incorporated by reference herein. This application also claims priority to U.S. patent application Ser. No. 10/900,351, filed on Jul. 28, 2004, which in turn claims priority to U.S. Provisional Application No. 60/493,107, filed Aug. 6, 2003, which are both incorporated by reference herein.

GOVERNMENT INTEREST

The invention described herein may be manufactured, used, and licensed by or for the United States Government.

FIELD OF THE INVENTION

This invention relates in general to a process and apparatus for quantum imaging using entangled photon pairs and in particular to a process using the properties of quantum imaging to generate an image of an object via correlations between photons or quantum particles reflected off and/or absorbed by an object and with photons or quantum particles that have never interacted with the object.

BACKGROUND OF THE INVENTION

The present invention relates in general to a process and apparatus for quantum imaging using entangled photon pairs, and in particular to the properties of quantum imaging used to generate an image of an object via correlations between photons or quantum particles reflected or absorbed by the object and with photons or quantum particles that have never interacted.

By way of background, the non-classical two-photon interaction or quantum entanglement was described by Albert Einstein et al. (Einstein, Podolsky, Rosen paradox), "Can Quantum-Mechanical Description of Physical Reality Be Considered Complete?" Physical Review, Volume 47, May 15, 1935, pgs. 777-800. The paradox of quantum entanglement, as described therein, relates to the concept that as a result of the process of measurement of a first system, using quantum mechanics, two different physical quantities are obtainable in the second system, despite the fact that at the time of the measurements, the two systems no longer interact and the second system is not disturbed in any way by the first. Einstein, et al, were unable to reconcile this quantum mechanical description of reality with the so-called classical physics determination that no "real" change can take place in the second system as a consequence of anything that may be done to the first system after the two systems no longer interact.

Quantum entanglement is a quantum mechanical phenomenon in which the quantum states of two or more quantum particles are linked together such that the quantum state of one quantum particle appears to interact with its counterpart; even though the individual quantum particles may be spatially separated. This apparent interconnection leads to correlations between observable physical properties of remote systems, since the interaction of the remote system with quantum state of one of a pair can be observed though observation of the counterpart. For example, according to quantum mechanics, the spin of a quantum particle is indeterminate until such time as some physical intervention is made to measure the spin; which, in general, could equally be spin-up or spin-down. However, when two members of an entangled pair are measured, one will always be spin-up and the other will be spin-down, regardless of the distance between the two particles. It is normally taught in quantum theory that no hidden variable theory can account for these results of quantum mechanics. The statistics of multiple measurements must generally relate to an inequality (called Bell's inequality), which is violated both by quantum mechanical theory and experimental results.

In U.S. application Ser. No. 12/330,401, hereby incorporated by reference, there is a general discussion of the need for the ability to image through obscuring media such as smoke or clouds, which is a problem faced by satellite imaging analysts, firefighters, drivers, oceanographers, astronomers, military personnel, and medical personnel. Conventional imaging techniques have, to a large extent, arrived at the theoretical limits of image resolution owing to wavelength-limited resolution, optical element distortions, and the reflective interaction between photons and an object to be imaged.

For ease of understanding, the terminology "test path" will be used to designate the path or beam of the photon(s) entering the object or target area. The terminology "reference path" will be used to designate the beam or path that the reference photon(s) travels.

As stated in U.S. application Ser. No. 12/330,401, incorporated by reference, ghost imaging holds the prospect of improving image resolution. Currently, quantum ghost imaging is largely dependent on the transmission of electromagnetic waves (photons) through the object to be imaged.

The theoretical work reported by Klyshko in "Combined EPR and Two-Slit Experiments: Interference of Advanced Waves", Physics Letters A, Volume 132, number 6.7, pp. 299-304 (1988) see also, Sov. Phys. Usp. 31, 74 suggested a non-classical two-photon interaction could exist.

The first two-photon imaging experiment was reported by Pittman et al., in "Optical Imaging by Means of Two-photon Quantum Entanglement," Physical Review, A, Vol. 52, No. 5, November 1995. According to the Pittman article, a two-photon optical imaging experiment was performed to test the two-particle entanglement as described by Albert Einstein et al. (Einstein, Podolsky, Rosen), referenced above, to determine if there was a correlation in position and in momentum for an entangled two-photon system; using "test beam or path" and "reference beam or path" photon pairs. Specifically, an aperture placed in front of a fixed detector was illuminated by a signal beam through a convex lens. A sharp magnified image of the aperture was found in the coincidence counting rate when a mobile detector was scanned in the transverse plane of the reference beam at a specific distance in relation to the lens. The experiment was named "ghost imaging" due to its surprising nonlocal feature.

Additional experiments are reported in Pittman, et al. "Optical Imaging by Means of Two-Photon Entanglement," Phys. Rev. A, Rapid Comm., Vol. 52, R3429 (1995) and ghost interference by Strekalov, et al, "Observation of Two-Photon 'Ghost' Interference and Diffraction," Phys. Rev. Lett., Vol. 74, 3600 (1995), which together stimulated the foundation of quantum imaging in terms of multi-photon geometrical and physical optics. The prior art transmissive ghost imaging optical scheme using entangled photons of Pittman et al. is depicted in FIG. 1.

Boto and colleagues (Boto, Agedi, et al.), in "Quantum Interferometric Optical Lithography: Exploiting Entanglement to Beat the Diffraction Limit", Physical Review Letters, Volume 85, Number 13, 25 Sep. 2000, The American Physical Society, pgs. 2733-2736, developed an entangled multi-photon system for sub-diffraction-limited imaging lithography and proposed a heuristic multiphoton absorption rate of a "noon" state and proved that the entangled N-photon system may improve the spatial resolution of an imaging system by a factor of N, despite the Rayleigh diffraction limit. The working principle of quantum lithography was experimentally demonstrated by D'Angelo, Milena, et al., in "Two-Photon Diffraction and Quantum Lithography", Physical Review Letters, Volume 87, Number 1, Jul. 2, 2001, pgs. 1-4, by taking advantage of an entangled two-photon state of spontaneous parametric down-conversion.

Quantum imaging has so far demonstrated two peculiar features: (1) reproducing ghost images in a "nonlocal" manner, and (2) enhancing the spatial resolution of imaging beyond the diffraction limit. Both the nonlocal behavior observed in the ghost imaging experiment and the apparent violation of the uncertainty principle explored in the quantum lithography experiment are due to the two-photon coherent effect of entangled states, which involves the superposition of two-photon amplitudes, a nonclassical entity corresponding to different yet indistinguishable alternative ways of triggering a joint-detection event in the quantum theory of photodetection as articulated by Glauber in "The Quantum Theory of Optical Coherence", Physical Review, Volume 130, Number 6, pp. 2529-2539, Jun. 15, 1963, and "Coherent and Incoherent States of the Radiation Field", Physical Review, Volume 131, Number 6, 15, pp. 2766-2788, September 1963. The nonlocal superposition of two-photon states may never be understood classically.

For further discussion, see U.S. application Ser. No. 12/330,401, hereby incorporated by reference. The ongoing lack of theoretical understanding of ghost imaging has hampered efforts to develop reflective ghost imaging systems for practical field uses in such fields as satellite, field, medical and research imaging. Moreover, there exists a need for a system using ghost image where feedback or measurement is not possible at the target area.

SUMMARY OF THE INVENTION

In a preferred embodiment of the present invention two or more entangled photons (ep) are generated. One part of the entangled pair (group) is sent toward a target along a target path (or beam). The other part of the entangled pair (group) is sent along a reference path (or beam) and retained for future measurement as a reference photon or photons. The target has an influence on the entangled photon pair (group) portion that is directed to the target area, and acts to make a "measurement" or "partial measurement" on it such that a preponderance of the measurements performed by the target are in one type of outcome (e.g.; color 1). The terminology of "measurement" in conjunction with a target or abject (e.g., "measurement by the target") is defined herein as meaning that the target influences the photon such that it affects a property (or characteristic) of the photon such as, for example, by absorption or reflection. Properties of photons include spin, polarization, transverse momentum, angular momentum, color, etc.

In a preferred embodiment of the present invention, the coincidence circuitry discussed in, inter alia, U.S. application Ser. No. 12/330,401, is replaced by time of flight considerations. The time of flight ($\Delta t$) as defined herein means the time that a photon takes to travel from the source to the target area. By knowing the time of flight of the target photon, and since photons generally travel at the speed of light, or by determining the distance traveled, the reference photon(s) are determinable.

For example, to determine whether or not an object exists in space using preferred embodiment of the methodology of the present invention, the distance traveled by the target path photon to the predetermined space is measured or the time of flight is determined. By knowing the time of flight (or distance traveled) of the target photon(s), the reference photon(s) is identified or determined. Similarly, by identifying reference photons which exhibit changed characteristics (such as color, spin, polarization), one can determine the existence of a target or object in the target space. For example, the distance that the target photon travels to the target space may be computed using the formula D (distance)=c (speed of light)×$\Delta t$ (time interval). Upon making determining this timing measurement $\Delta t$, one can determine whether it is likely or unlikely that there was a target in the space based upon the reference path entangled photon that traveled during the same $\Delta t$.

For example, using a preferred embodiment of the present invention, the reference photon may be measured at a predetermined delay time in order to determine whether or not one is likely to interact with a target at a measureable distance on the test path. If the measure of the photon in the reference arm indicates the presence of an object in the test arm, this indicates the maximum distance that the test arm photon could have traveled in that time before being absorbed by a target or object. Reference photons can be incrementally measured; with a shorter time being selected the target photon has been absorbed so that one can determine where a target begins. Since the changing of a property of a photon in the target path will result in a correlated change in a property of the reference path photon, objects will be discernable by examining a preponderance of the measurements of intensities of reference photons. For example, upon detection of a ratio of color intensities, an object will become discernable. By measuring the photons in the reference path at different traverse displacements, one can determine a transverse momentum of the reference photon. The transverse momentum of the test photon will either have correlation or anti-correlation of transverse momentum in relation to the reference photon. Moreover, the reference photons will strike at different positions in the detector; e.g. a CCD detector device. For example, if a camera is used as a detector in the reference path, the photon will intersect the plane of the camera at a transverse spatial location. Assuming that the longitudinal direction is direction of photon, the horizontal plane of the detector will be perpendicular to the longitudinal direction of the photon is designated herein as the reference plane. The x and y coordinates of a photon detected in the reference plane will indicate similar or opposite displacements in the target plane. To obtain such measurements, one can use a very fast CCD with precise timing. Using a color camera, red and green results are obtainable in same plane. Preferentially, a camera may be selected such that a single element in the reference plane can discriminate between photons. Optionally, in order to provide simultaneous measurement of two colors, a 4000 pixel CCD could be used with a prism that separates colors. The colors or property selected will depend on the property that the target impacts. For example, red and green photons may be generated for use with a target that absorbs red and/or green, since the target will preferentially pick red and/or green. Moreover, it is desirable to pick a spectrum that covers colors discriminated by device absorption. In addition, some materials have preferential absorption based upon polarization. The CCD measures number of photon hits or counts. By looking at a comparison between red and green counts, one will be able to determine an image of the object/target. If no target, both colors will come up equally distribution. If there is a target in the space, the distribution will unequal. Similarly, the perimeter of the object or target can be determined based upon the distribution of colors in the reference plane. The image of the object could be determined using colors, pseudo colors or contours to show color distribution. Properties of entangled photon pairs include color, polarization, spin angular momentum, orbital angular momentum, and phase. Using the principles of the present invention, one can entangle properties separately or in combination, such as by combining polarization and color. Additionally, one property can be simultaneously entangled with another, such as color and horizontal and vertical polarization where there is no correlation between color and polarization, or alternatively, the photons can be built such that the photons have more than two states; e.g., the photons may be both polarization entangled and color entangled so to enable four different possible outcomes and strategies for detection based upon those outcomes.

Photonic properties are selected such that if a given target interacts with a photon property, the target can in some sense make a measurement as to what type of photon it reflects, absorbs or changes one of the properties of the photon. As another example, a given target material may change the change the spin of the particle or photon. If using polarization, the target may reflect some polarizations and absorb others. In addition, the target could also change the polarization. Examples of substances which affect polarization are sugar water, and quartz. In order to determine how certain substances react with photons, references are available from National Institute of Standards (NIST), which lists the optical properties of many materials. Also, Handbook of Chemistry and Physics (CRC) lists the optical properties of chemicals and substances.

As an alternative, measurement can be taken of how a given object interacts will photonic properties. For example, one can take an object such as airplane wing material and experimentally determine what type of photon is best suited for detection purposes using the principles of optical metrology.

BRIEF DESCRIPTION OF THE DRAWINGS

FIG. 5A is a schematic of an inventive quantum ghost imaging scheme, operating with entangled or thermal photons with reflection from an object;

FIG. 8B is a perspective schematic view of quantum ghost imaging according to FIG. 8A with a partially transparent mask encoding the letters "ARL";

FIG. 9 is a perspective schematic view of quantum ghost imaging generated with a correlated photons of a light emitting diode (LED) incoherent light source;

FIG. 12A is an instantaneous image of the spatially varying intensity of light source; FIG. 12B is an averaged image of the light source; FIG. 12C is the $G^{(2)}$ image of the obscured object reflection; FIG. 12D is an instantaneous image of the light source; object reflection; and FIG. 12E is an averaged image of the source; FIG. 12F is the $G^{(2)}$ image of object reflection. In this example the location of the obscuring medium is at position 15 of FIG. 5. However, the inventive process compensates for obscuring medium regardless of location.

DESCRIPTION OF THE PREFERRED EMBODIMENTS

Figure 1:
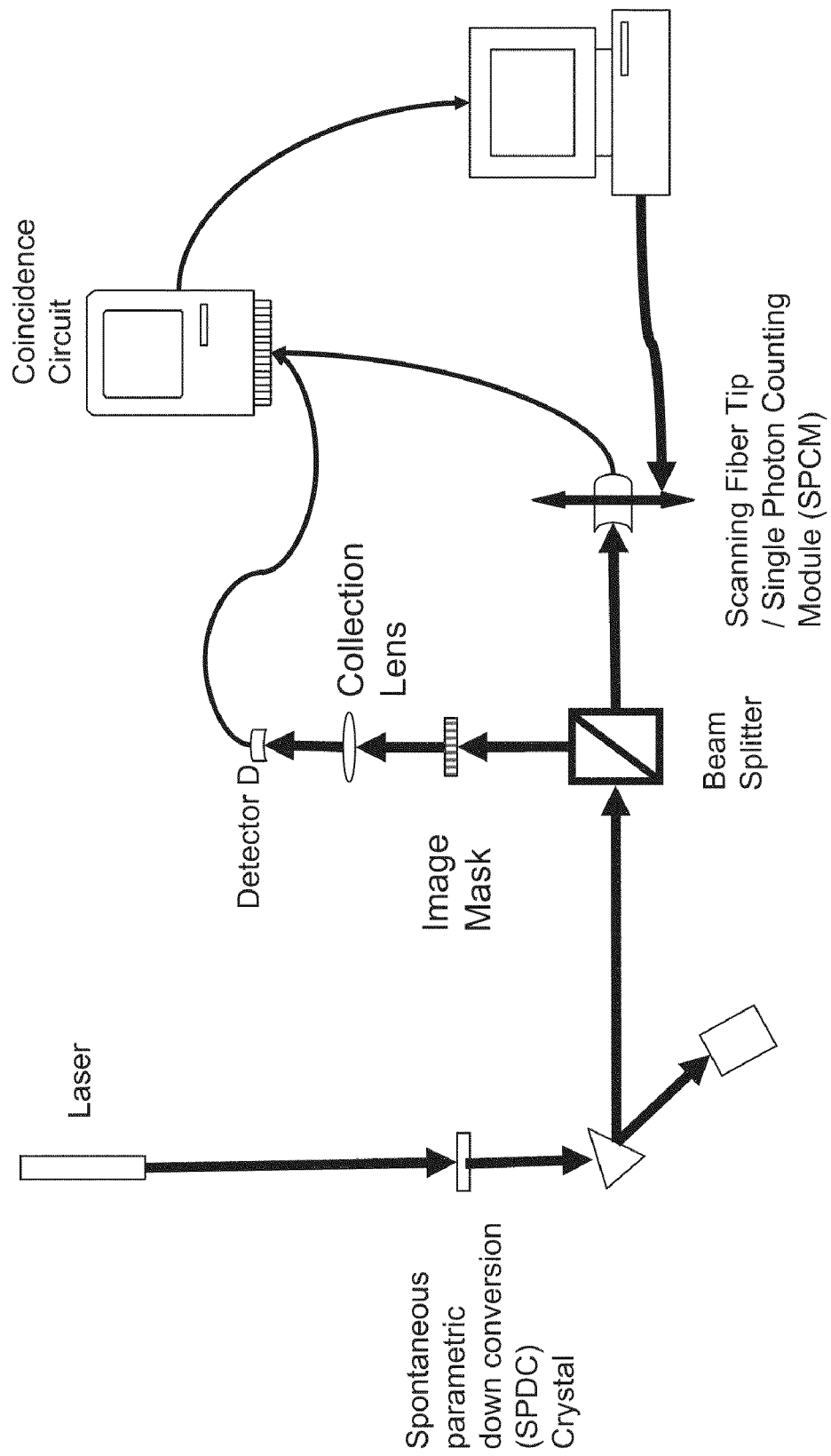
FIG. 1 is a prior art scheme depicting a quantum ghost imaging technique based on object transmission using entangled photons.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. In the drawings, the dimensions of objects and regions may be exaggerated for clarity. Like numbers refer to like elements throughout. As used herein the term "and/or" includes any and all combinations of one or more of the associated listed items.

The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element such as an object, layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that, although the terms first, second, etc. may be used herein to describe various elements, components, regions, layers and/or sections, these elements, components, regions, layers and/or sections should not be limited by these terms. For example, when referring first and second photons in a photon pair, these terms are only used to distinguish one element, component, region, layer or section from another region, layer or section. Thus, a first element, component, region, layer or section discussed below could be termed a second element, component, region, layer or section without departing from the teachings of the present invention.

Furthermore, relative terms, such as "lower" or "bottom" and "upper" or "top," may be used herein to describe one element's relationship to other elements as illustrated in the FIGS. It will be understood that relative terms are intended to encompass different orientations of the device in addition to the orientation depicted in the FIGS. For example, if the device in the FIGS. is turned over, elements described as being on the "lower" side of other elements would then be oriented on "upper" sides of the other elements. The exemplary term "lower", can therefore, encompass both an orientation of "lower" and "upper," depending of the particular orientation of the FIG. Similarly, if the device in one of the FIGS. is turned over, elements described as "below" or "beneath" other elements would then be oriented "above" the other elements. The exemplary terms "below" or "beneath" can, therefore, encompass both an orientation of above and below. Furthermore, the term "outer" may be used to refer to a surface and/or layer that is farthest away from a substrate.

As used herein the terminology target path, object path, target beam, object beam, test path or test beam refers to the beam or path directed to the target or object space and or area. The terminology reference path or beam relates to the photon path or beam which is detected and/or measured. The terminology is not intended to limit the scope of the invention inasmuch as other terminology could be used to similarly describe similar operating systems.

Embodiments of the present invention are described herein with reference to cross-section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region or object illustrated as a rectangular will, typically, have tapered, rounded or curved features. Thus, the regions illustrated in the FIG.FIG. are schematic in nature and their shapes are not intended to illustrate the precise shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will also be appreciated by those of skill in the art that references to a structure or feature that is disposed "adjacent" another feature may have portions that overlap or underlie the adjacent feature.

As used herein the terminology object or target space means an area or space in which a target may or may not be detected. In medical applications, the target may be a body or a component of the body. In environmental applications, the target area may be an area in space which is subject to surveillance. The target subject to surveillance may be an aerial vehicle or the like, a satellite, or an object in space. The target area may also be at ground level and involve areas of the ground or landscape. Accordingly, the invention may be used for purposes of mapping or imaging an area on the ground.

The present invention has utility as a ghost imaging system that provides object imaging without directly measuring photons that have interacted with the target.

In a preferred embodiment using red and green entangled photons (for example) generated by a light source split by using a beam splitter such that the colors in each path are in superposition; i.e., both colors travel on both paths. Each time a red part of an entangled photon pair gets absorbed, other part (the reference part) of the entangled photon pair must be green (the conjugate) due to the red part's absorption. By positioning a receiving "camera" in the path of the reference part, one can detect and/or measure the reference part, without the need to measure the part which is absorbed by the target. In effect, the target will "measure" 1/2 the entangled pair, such as is done by a bucket detector in U.S. application Ser. No. 12/330,401, but unlike the case of a bucket detector, the results are not transmitted by the target. At the camera, one determine that the target appears red when all light has been absorbed except for red. The target conjugate variable will be measurable by recognizing the properties of entanglement, since only one photon of the pair needs to be measured. For example, if target absorbed red photons, that will cause other of the conjugate pair to appear as green. As an analogy to the invention disclosed in U.S. Pat. No. 12/330,401 (ARL 07-33), one can consider the absorption of photon by a bucket detector where electrons are transmitted. Similarly, when an entangled photon hits a target, then when the other photon is measured, the outcome (or result) will become biased. A target that is not giving readings into classical channels (such as a black hole) can be detected using the present invention. Detection is made through only a referenced one (group) of the entangled photon pair that is saved, measured and found to have the conjugate property (e.g., the conjugate color). After a series of such entangled photons are sent towards the target where one portion interacts with the target and the other portion is measured, a ghost image of the target is formed. The preponderance of measurement outcomes of the reference photons will express the ghost image of the object.

If an object preferentially absorbs one particular color, the other color will be preferentially maintained via the conjugate pair. Longer wavelengths of light will have lower frequency and less energy. Energy of parent photons will total the sum of the split photon parts; i.e., Planck constant times frequency (nu)=energy $$E = hf = \frac{h}{2\pi}(2\pi f) = \hbar\omega$$

where the frequency f of the quata of radiation (photons) are related by Planck's constant h, and $\omega = 2\pi f$ is the angular frequency of the wave.

The principles of the invention (and the preferred embodiments disclosed herein) can be used to ghost image ordinary objects or highly absorbent objects which reflect little or no electromagnetic radiation. The principles of the present invention apply also for X-rays or any conjugate pair of quantum quantities.

The principles of the present invention (and the preferred embodiments disclosed herein) can be used to detect targets which may be solid, liquid, gaseous, or other states of matter.

Figure 13:
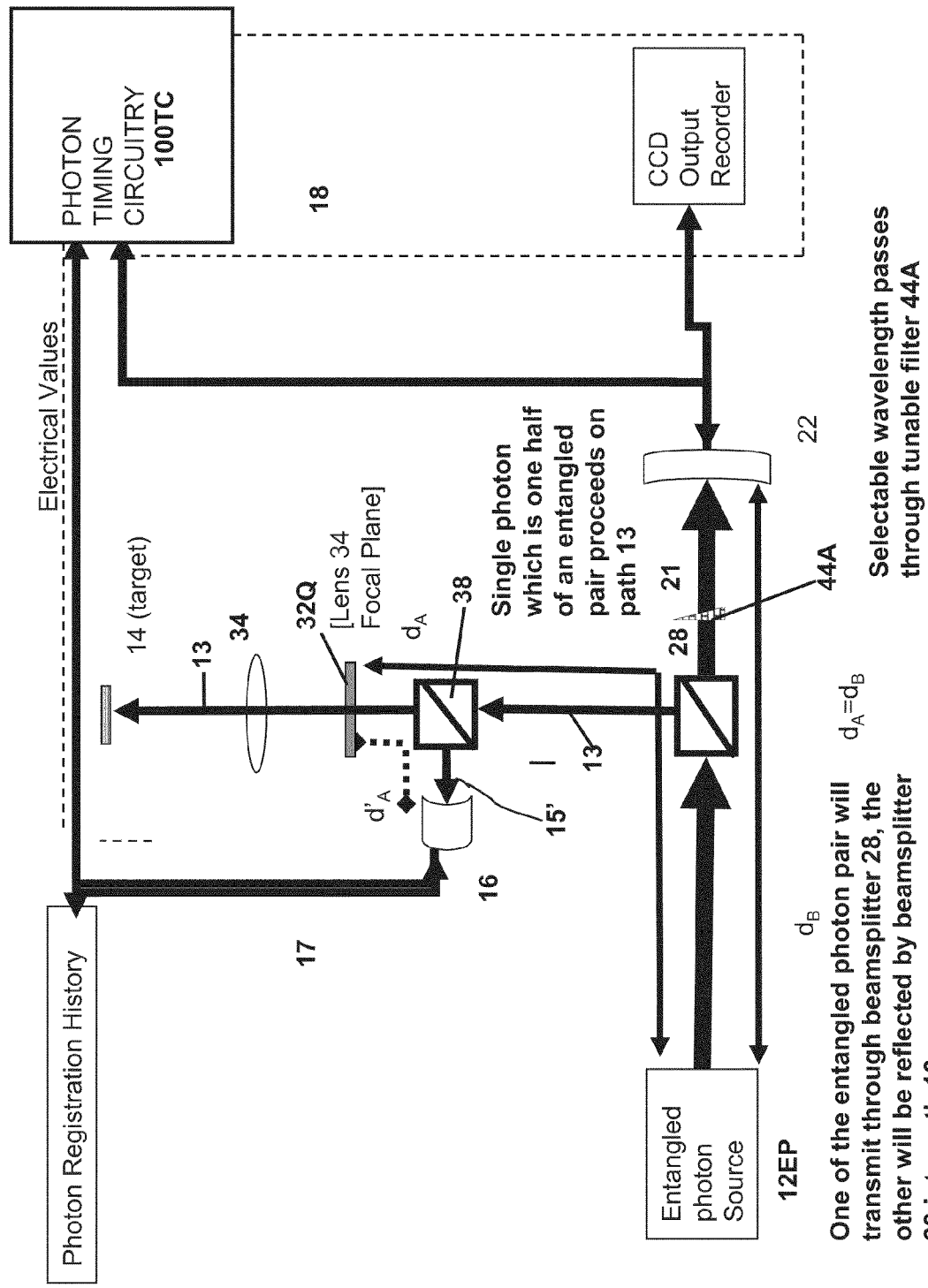
FIG. 13 is an illustration of a preferred embodiment utilizing an entangled photon source and coincidence circuitry.

A preferred embodiment is shown in FIG. 13 where the Coincidence Circuit and the electrical values leading there are removed. The Object 14 makes all the measurements on the test path needed for such an embodiment. While the example is with colors other quantum properties can be used such as polarization and atomic spins.

The source of radiation may be an entangled photon light source. The present invention may be practiced using all wavelength forms of light (e.g., X-rays, visible, etc.). The photons from the light source are divided into two paths. In one path is the object to be imaged, in the other path images of the entangled photon are measured independent of direct interaction with the object(s). Any or all paths may pass through an obscuring medium. The measurements of the entangled photon pair part is then stored for future processing. When the entangled photon pair beam passes through the beam splitter (e.g., 28), the conjugate entangled properties of the photons are going to be in a superposition on each path. Once the target photon is influenced by the target, then the conjugate property can be measured by a detector in the reference path.

A process for solving for the $G^{(2)}$—like Glauber coherence between the two paths is provided to reconstruct the image. With respect to the terminology $G^{(2)}$—like Glauber coherence, inasmuch as a bucket detector is not used in the target path, the form of the equation remains the same, although the target path bucket detection input is derived from measurements on the reference path. The $G^{(2)}$—like Glauber coherence between the two paths is used to generate a correlation two-photon ghost image. The present invention is not limited to photons and can be conducted with any quantum particle; provided there is entanglement. The principles of the present invention are not limited to light and may be practiced utilizing, e.g., electron, proton or neutron sources as the "illuminating" component of the ghost imager. Moreover, the obscuring materials may comprise foliage or vegetation in remote sensing applications and tissue in medical applications. Ghost imaging may be used to achieve higher resolution than the standard Rayleigh diffraction limit using entangled or non-entangled quantum particles or other forms of radiation referenced herein.

The present invention is directed to a ghost imaging system that provides object imaging without the need for classical reflective object imaging. In accordance with an embodiment of the present invention, the photon ghost image is theoretically less dependent on image distortion associated with photon transit through obscuring medium and in practice there is only nominal image distortion associated with light traveling through an obscuring medium when utilizing a preferred embodiment ghost imaging system. Representative obscuring media according to the present invention illustratively include fog, an aerosol, particulate whether suspended in air, water, or vacuum media; turbulence; liquid, vegetation, foliage, tissue, sand, or frosted glass.

A process for solving for the $G^{(2)}$—like Glauber coherence of Equation 3 (provide hereafter) between the two paths is provided to reconstruct the image. This coherence between the time of travel along the target path and the reference path is used to generate a correlation two-photon ghost image. One or more spatially addressable detectors are used to generate images. The resultant ghost corresponds to a convolution between the aperture function, or the amplitude distribution function, of the object and a $\delta$-function like second-order correlation function of Glauber coherence. Furthermore, the measurement device may be a charged coupled device (CCD) operating as a spatially integrated detector. Alternatively, the spatially integrated detector may further comprise means for modifying sensitivity of specific pixels on the spatially integrated detector prior to producing the bucket detector signal. For example, acting as a diffraction grating of a certain order or imprinting an identification mark. Any array of detectors that covers an area or any detector that scans an area may be used in place of a CCD.

In general, in the preferred embodiments described herein, an entangled photon source (such as 12EP) emits a beam of entangled photons. In order to determine the timing of a photon, a pulsed laser source could be utilized; providing ease of measurement in order to determine a specific departure time for the photon exiting the light source. In the alternative, the entangled photon source may include, for example, first and second lasers that are continuous wave (cw) diode lasers at λ nm, and neutral density filters used to reduce the intensity for photon counting. Any suitable laser can be used, such as solid state lasers, semiconductor lasers (such as red diode lasers), and the like.

The entangled photon source may further include nonlinear crystals such as beta barium borate (BBO) crystals, provided in front of each laser to generate time entangled pairs of photons. The first nonlinear crystal may have an optic axis oriented at 0°, the second nonlinear crystal had an optic axis oriented at 45°. The nonlinear crystals may be provided with appropriate angles to generate Type-I parametric fluorescence with degenerate wavelengths for signal and idler.

As described more fully in U.S. application Ser. No. 10/900,351, hereby incorporated by reference, the crystals may be cut and adjusted for Type-I phase matching conditions for collinear and degenerate parametric fluorescence of the symmetric energy state. Both energy states have the same polarization. In Type-I spontaneous parametric down-conversion, an incident photon is split into a pair of photons having equal energies. The laser wavelength used will depend on various factors, such as transparency windows in the medium used to convey photons between the sender and receiver. For example, fiber optic cable typically has good transmission properties around 1500 nm, so that a 750 nm laser could be chosen. The atmosphere has good transmission at yellow/ green wavelengths, so if atmospheric transmission is desired a laser wavelength of about 250 nm could be used. The energy of the two entangled photons will add up to the energy of a laser photon. Typically, the two entangled photons will have half the energy (double the wavelength) of a laser photon. However, this need not necessarily be true, as discussed further below. There may be advantages in this scheme to having the transmitted photon be more or less than half the energy of the laser photon, for example to use a transparency window in the transmission medium in conjunction with a desired laser type and/or sender side detectors. Detector sensitivity may be another factor in wavelength choice.

Figure 14A:
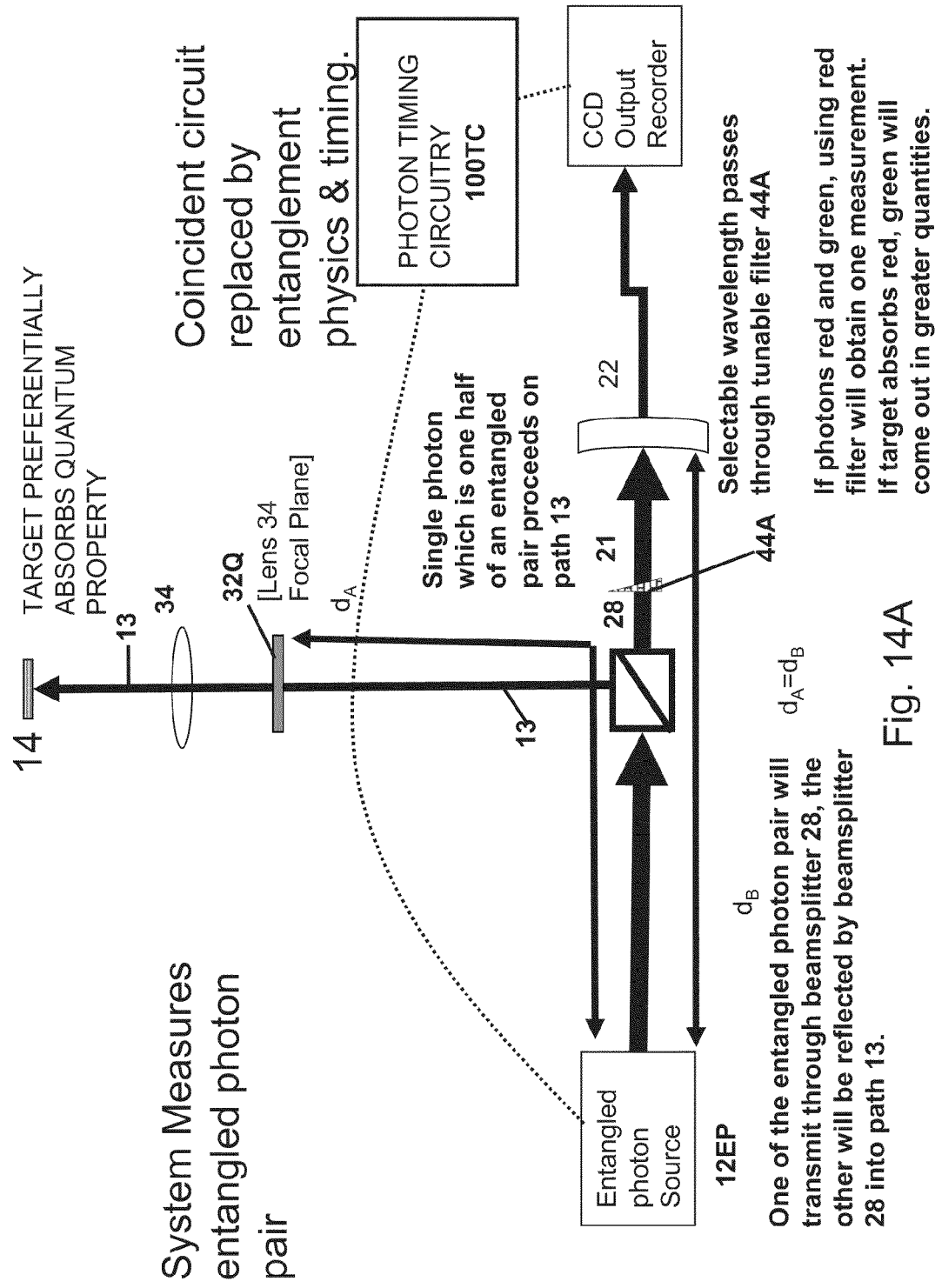
FIG. 14A is an illustration of a preferred embodiment depicting the measurement of one half of an entangled photon pair where the target preferentially absorbs a quantum property.

As shown in FIG. 14A, the photon pairs generated by the light source 12EP are incident on the first beam-splitter 28. At beam splitter 28, the photons from the light source 12EP are divided into two paths. The beam splitter 28 is an optical component that allows part of an electromagnetic beam to pass through and reflects the rest. Beam splitters 28 can be, but is not restricted to, cemented right prisms or partially silvered mirrors. One of an entangled photon pair will transmit through the beam splitter 28 into path 21, the other of the entangled photon pair will be reflected by the beam splitter 28 and enter into path 13. The term path, as used herein, may be any form of a data route, such as a wire, radio frequency (RF) transmission field, or an optical path. A half of an entangled photon pair proceeds along path 13, until it encounters a target 14. Optionally, a lens 34 may be positioned in the path 13 between the beam splitter 28 and the target 14, so as to provide focusing. Also depicted in FIG. 14A is the lens focal plane 32Q. The target may, for example, preferentially absorb a quantum property. In accordance with the Einstein, Podolsky, Rosen Paradox. The quantum property which the target preferentially absorbs will be the conjugate of the quantum property of the other of the part of the entangled photon pair which is transmitted along path 21; i.e., a measurement on one photon pair instantly influences the other of the photon pair. In this case, the "measurement" occurs when the target preferentially absorbs the photon pair portion.

Optionally positioned in path 21 may be a tunable filter 44A. For example, if the entangled photon source is emitting red and green, one could used a tunable filter which passes only red in the path 21 so as to obtain a measurement of the red passing through tunable filter 44A onto a spatially addressable detector 22, which may be, e.g., a CMOS, CCD (charge coupled device array and/or scanning fiber tip).

Figure 2:
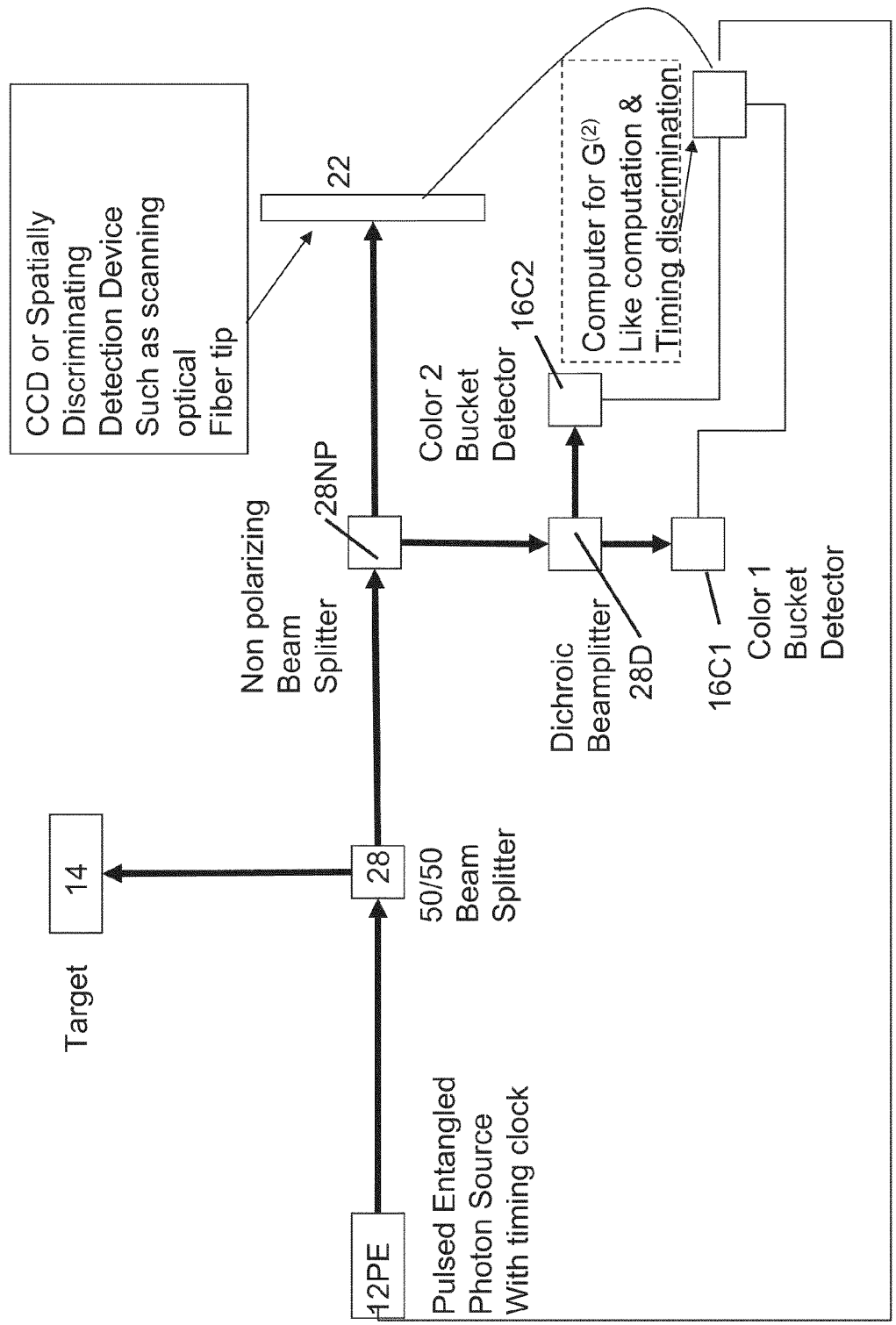
FIG. 2 is a schematic depicting a preferred embodiment quantum imaging technique using entangled photons.

FIG. 2 is an alternate embodiment of FIG. 14A. Shown in FIG. 2 is a pulsed entangled photon source with clock 12PE, from which a beam of entangled photons is emitted into a first beam splitter 28. Also shown in FIG. 14A, there is a selectable wavelength tunable filter 44 in front of the CCD 22. In FIG. 2, in place of selectable wavelength tunable filter 44, another nonpolarizing beam splitter 28NP has been added. Beam Splitter 28D is a dichroic beam splitter which reflects one range of colors and transmits another range of colors. Also added are two bucket detector 16C1 and 16C2. Bucket detector 16C1 detects color 1 and bucket detector 16C2 detects another color C2. The ratios change when you have a change in the target photon property when it interacts with the target 14. If target 14 absorbs color 1 and the entangled pair comprises colors 1 and 2, then there will be an imbalance in the ratio of the counts of bucket detectors 16C1, 16C2. By analyzing the results, a weighting can be given to the predominate color in order to determine the color absorbed at the target 14. If this ratio (or difference in color counts) is inserted into the $G^{(2)}$—like calculation in place of the target bucket detector measurement, an image of the object or target may be generated.

The above-described preferred embodiment is distinguishable from the preferred embodiment illustrated in FIG. 13 of U.S. application Ser. No. 12/330,401 ('401 application) (hereby incorporated by reference) inasmuch as the coincident circuitry shown in FIG. 13 has been omitted. Instead of utilizing the coincidence detection circuitry of the preferred embodiment of FIG. 13 of the '401 application, the preferred embodiment of FIG. 14A uses the principles of entanglement physics. These principles include the principle that if the target absorbs a particular quantum property of a part of an entangled photon pair, the conjugate of the quantum property will be present on the reference part of the entangled photon pair.

Several exemplary systems relating to quantum entanglement are disclosed in U.S. application Ser. No. 10/900,351, filed on Jul. 28, 2004, hereby incorporated by reference. FIGS. 1 through 5 of U.S. application Ser. No. 10/900,351 are represented as FIGS. 14B to 14F herein. The present invention, which utilizes entanglement, may incorporate the entanglement principles (including effects on polarity) exemplified in the following systems.

Heralded Stochastic Quantum Key Distribution (HSQKD) System

Figure 14B:
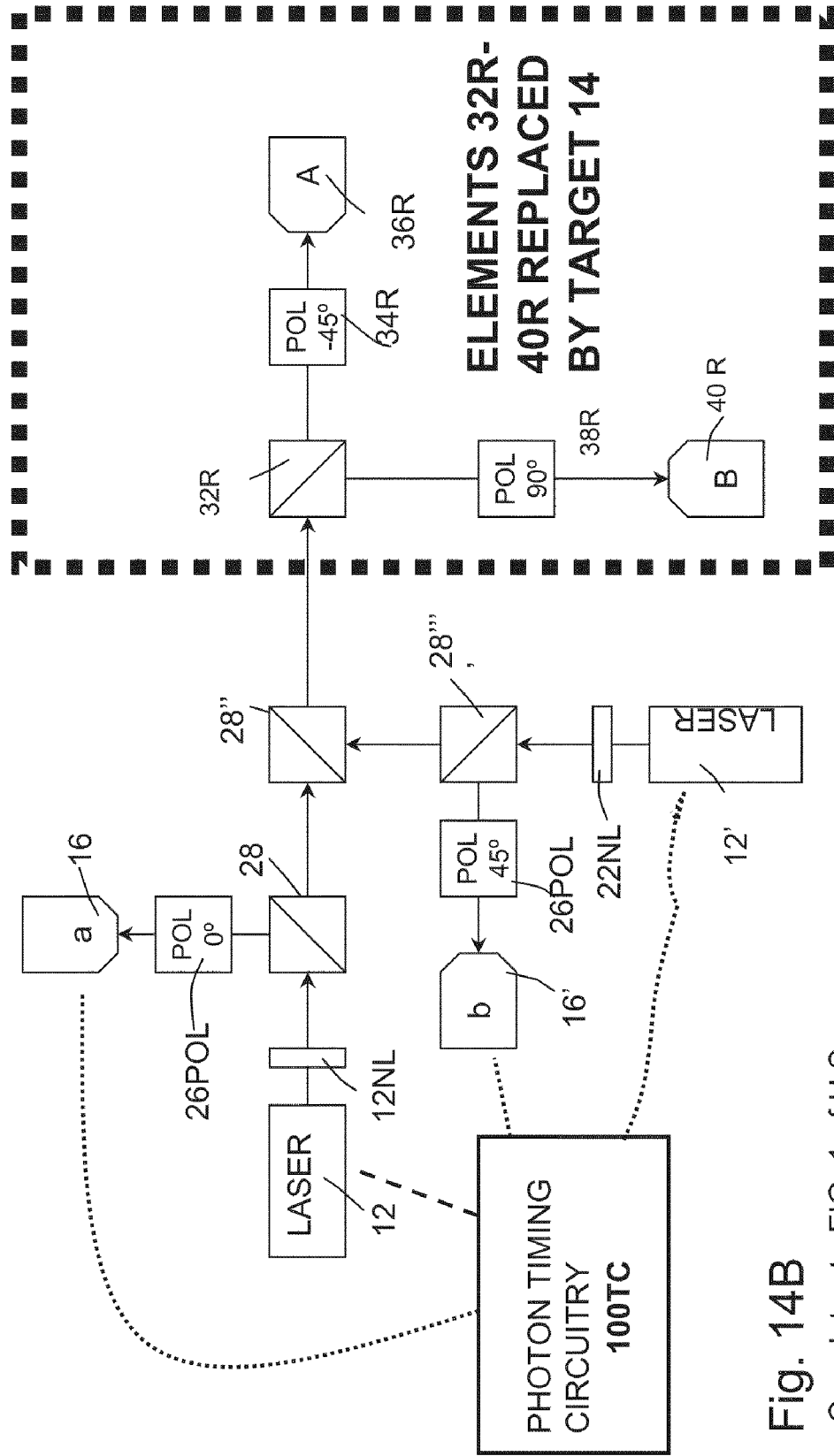
FIG. 14B is a schematic of a Heralded Stochastic Quantum Key Distribution (HSQKD) system.

The Heralded Stochasitic Quantum Key Distribution (HSQKD) is described more fully in U.S. patent application Ser. No. 10/900,351, hereby incorporated by reference, FIG. 14B (a schematic of a HSQKD system) correlates to FIG. 1 of U.S. patent application Ser. No. 10/900,351. Briefly, the HSQKD system includes a sending system and a receiving system. As shown in FIG. 14B, the sending system comprises a first laser 12, a first nonlinear crystal 12NL, a first beam-splitter 28, a first polarizer 16POL, a first detector 16, a second laser 20, a second nonlinear crystal 22NL, a second beam-splitter 28", a second polarizer 26POL, a second detector 16', and a beam recombiner 30. The receiving system (receiver) includes receiver beam-splitter 32R, a first receiver polarizer 34R, a first receiver detector 36R, a second receiver polarizer 38R, and a second receiver detector 40R. The lines joining optical components show beam paths, the arrows indicate direction of the beams.

As described more fully in U.S. application Ser. No. 10/900,351, the sending system has two input channels: a first input channel comprising laser 12, nonlinear crystal 12NL, beam-splitter 28, polarizer 16POL, and detector 16 and second input channel comprising laser 20, nonlinear crystal 22, beam-splitter 28', polarizer 26POL, and detector 16'.

The lasers of the sending system are described more fully in U.S. application Ser. No. 10/900,351, hereby incorporated by reference.

The photon pairs generated by the nonlinear crystals 12NL and 22NL incident on beam-splitters 28 and 28", respectively, have a 50/50 chance of progressing to the beam combiner 30 or being diverted through the polarizers 16POL, 26POL to detectors 16,16'. The remaining photons (photons not directed to the first or second detectors) are recombined by the beam recombiner 30 (another 50/50 beam-splitter) into a single beam that is sent to the receiver beam-splitter (32R) (a polarizing prism, with outputs oriented at 0° and +90) which divides the received photons into two paths as shown in FIG. 14B; a first path directed the first receiver polarizer (34R) (oriented at −45°) and receiver detector 36R and a second receiver channel directed to receiver polarizer 38R (oriented at +90°) and receiver detector 40. Signals are monitored for the four detectors (16, 16', 36R & 40R) correspond to photon polarizations of 0°, +45°, +90°, and −45°, respectively.

Detectors 16, 16', 36R, & 40R may be, for example, single photon counting modules (SPCMs), denoted a, b, A, and B respectively. Detectors 16, 16', 36, & 40 with, as accessories, a photon collector and a fiber optic link conveying photons incident on the photon collectors to electronic modules. Further details were described in application Ser. No. 10/900,351.

The time interval during which a photon is either detected or not detected is typically about a nanosecond. For atmospheric transmissions, or other transmission where variability in ambient conditions may be present, a longer time interval, such as 2 or 4 nanoseconds can be used. In ideal conditions, the time interval could be reduced, for example to 0.1 ns.

The advantages of the HSQKD system include the following. The exchanged data between the sender and receiver comprises the times of photon detections. The sender and receiver can use synchronized clocks, exchange a timing pulse, or receive time information from a common clock. The sender is reasonably certain when a photon has been sent, based on an entangled photon detected at a detector on the sender's side. The HSQKD system provides improved signal-to-noise ratios and the combination of stochastic time-dependent variation (with no external modulation) and sender detection of one photon of an entangled pair provides great advantages over previous methods.

It can be appreciated that when utilized in connection with the present invention, the receiver portion, shown by dotted lines in FIG. 14B is omitted. Instead, the beam emitted from the combiner 30 is directed to a target 14.

Stochastic Heralded QKD Protocol

The Stochastic Heralded QKD Protocol is described more fully in U.S. application Ser. No. 10/900,351, hereby incorporated by reference, a brief summary of which is provided below. In the Stochastic Heralded QKD system, the sender and receiver both have synchronized clocks, or use a timing pulse, and their detectors can measure at most one photon in any time interval.

The following notations may be used in conjunction with FIG. 14B: a=First detector (18), orientation 0°; b=Second detector (28), orientation +45°; A=First receiver detector (36), orientation −45°; B=Second receiver detector (40), orientation +90°.

The sender at time $\tau_j$ (j=1, 2, 3, ...) detects a photon in one of these four cases: (i) one at a but not at b, or (ii) one at b but not at a, or (iii) one at a and one at b, or (iv) none at all. The receiver at the same time $\tau_j$ detects a photon in one of these four cases: (v) one at A but not at B, or (vi) at B but not at A, or (vii) one at A and one at B, or (viii) none at all. The sender discards all cases except (i) and (ii), and records only times $\tau_j(a)$ where case (i) occurred, and times $\tau_j(b)$ where case (ii) occurred. The receiver discards all cases except (v) and (vi), and records only times $\tau_j(A)$ where case (v) occurred, and times $\tau_j(B)$ where case (vi) occurred. The receiver then sends a list of $\tau_j(A)$ and $\tau_j(B)$ to the sender by a classical channel.

The sender generates a list of times $\tau_j(c)$ where cases (i) and (v), or (ii) and (vi), occurred and sends the list to the receiver by a classical channel. The sender compares the list of $\tau_j(a)$ to the list of $\tau_j(a)$ and $\tau_j(b)$, and the receiver compares the list of $\tau_j(c)$ to the list of $\tau_j(A)$ and $\tau_j(B)$.

The Heralded Stochastic Quantum Key Distribution scheme allows entanglement to be used to simplify both the optics and the electronics, while achieving security and speed. The protocol maintains secrecy and takes advantage of the photon stochasticity from parametric down-conversion crystals.

The quantum property may be represented by an operator $K_i$. The protocol for determining $K_i$ is summed up in Table 1 below. Whether or not the background of signals are rejected depends on the two-photon quantum state with either an identity or inverse operator.

TABLE 1

|        | Receiver    |          |
|--------|-------------|----------|
| Sender | A           | B        |
| a      | Identity    | Inverse  |
| b      | Inverse     | Identity |

Table 1 shows $K_i$ operating on bit values (in $r_i$) of photons sent at a or b and photons received at A or B. $K_i$ provides the identity operation at aA and bB, and the inverse operation at aB and bA. For example, the identity operator may leave a bit value unchanged, while the inverse operation changes bit 0 to bit 1 and bit 1 to bit 0.

The joint probabilities for both message and background are given in Table 2 for distinguishable particles, and Table 3 for indistinguishable particles.

TABLE 2

| First | Second |       |       |       |       |
|-------|--------|-------|-------|-------|-------|
|       | 0      | a     | b     | A     | B     |
| 0     | Noise  | Noise | Noise | Noise | Noise |
| A     | Noise  | 1     | Ind   | ¼     | 0     |
| B     | Noise  | Ind   | 1     | 0     | ¼     |
| A     | Noise  | ¼     | 0     | NA    | NA    |
| B     | Noise  | 0     | ¼     | NA    | NA    |

Table 2 above is a joint probability table for the two-photon distinguishable state. Values in the table represent the conditional probability of detecting a second photon at a detector labeled in the row given that the first photon has already been detected at the detector (or target) labeled in the column. A probability of 0 is labeled either noise or not applicable (NA) and a probability of 0.5 (i.e., totally independent detections) is labeled Ind.

TABLE 3

| First | Second |       |       |       |       |
|-------|--------|-------|-------|-------|-------|
|       | 0      | a     | b     | A     | B     |
| 0     | Noise  | Noise | Noise | Noise | Noise |
| A     | Noise  | 1     | Ind   | ½     | 0     |
| B     | Noise  | Ind   | 1     | 0     | ½     |
| A     | Noise  | ½     | 0     | NA    | NA    |
| B     | Noise  | 0     | ½     | NA    | NA    |

Table 3 above shows the joint probability table for the antisymmetric two-photon indistinguishable state. Values in the table represent the conditional probability of detecting a second photon at a detector labeled in the row given that the first photon has already been detected at the detector labeled in the column. A probability of 0 is labeled noise or not applicable (NA) and a probability of 0.5 (i.e., totally independent detections) is labeled Ind.

Modification of the Heralded Stochastic Quantum Key Distribution scheme in the utilization of the present invention would entail elimination of the elements shown in the dashed box in Energy Entangled Stochastic Quantum Key Distribution (EnESQKD)

Figure 14C:
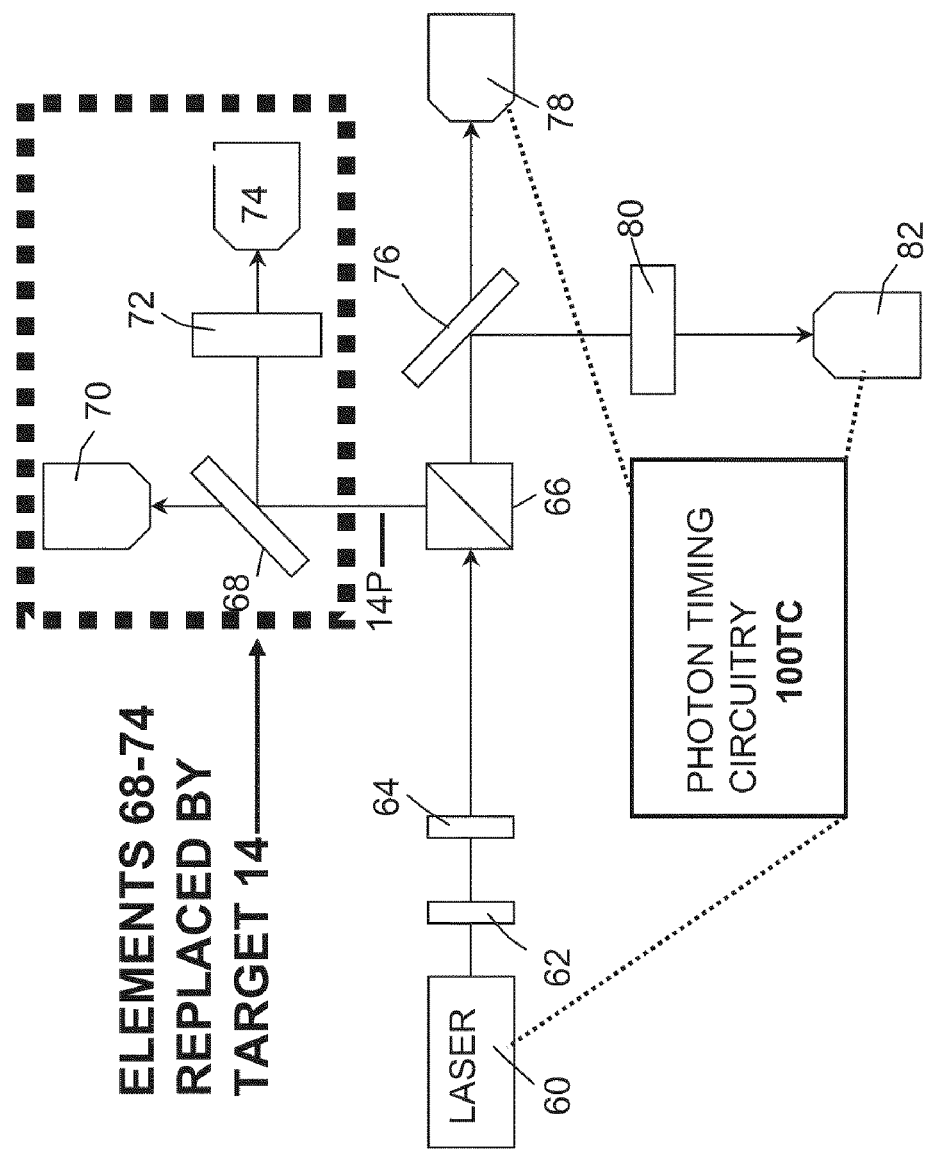
FIG. 14C is a schematic of an Energy Entangled Stochastic Quantum Key Distribution (EnESQKD) system.

An Energy Entangled Stochastic Quantum Key Distribution (EnESQKD) system is shown in FIG. 2 of U.S. application Ser. No. 10/900,351, hereby incorporated by reference. FIG. 14C correlates to FIG. 2 of U.S. application Ser. No. 10/900,351. In that system, energy filters are used to transmit or reflect the conjugate entangled energies in a manner that is similar to polarization in other systems described elsewhere in this specification and in U.S. application Ser. No. 10/900, 351.

Briefly, as shown in FIG. 14C, the sending system comprises a laser 60, nonlinear crystal 62, attenuation filter 64, and beam-splitter 66. Signals are sent to two receiver paths. The first detection system path includes dichroic mirror 68, detector 70, optical filter 72, and detector 74. The second detection system path, which is accessible by the sender, includes dichroic mirror 76, detector 78, optical filter 80, and detector 82.

The EnESQKD sending system generates nearly collinear energy entangled photons. The Type I non-linear crystal 62 generates a pair of Type I SPDC photons, which are incident on the 50/50 (non-polarizing) beam-splitter 66, and directed to either the first detection system or to the second detection system paths.

Photons directed to the first detection system are incident on the dichroic mirror 68; some of which are transmitted to the first detector 70, while other photons are reflected by dichroic mirror 68 into the path of optical filter 72 and director 74. Photons directed by beam splitter 66 to the second detection system path may be detected by the third detector 78 or fourth detector 82, by analogous processes. Detectors 70, 74, 78 & 82 can be single photon counting modules (SPCMs), although other photon counting detectors can be used. Further details of the two detection systems are disclosed in U.S. application Ser. No. 10/900,351, hereby incorporated by reference.

The nonlinear crystal and laser are configured to produce entangled pairs of photons, the entangled photons having different energies. The energy of each photon of an entangled pair need not be the same, even though the total energy sums to the energy of a laser photon. Using known laser and non-linear crystal geometries, an entangled pairs of photons are created, the photons having a different energy.

In examples of this system, the first detection system is in possession of the remote receiver, and the second detection system is in possession of the sender. Detection time data can be shared as described above in relation to FIG. 14B, and analogous methods. As in the system described above in relation to FIG. 14B, the sender generates an entangled photon pair, sends one of the entangled pair to the receiver, and detects the other photon of the entangled pair.

The following example is provided for illustration. If the laser photon wavelength can be 400 nm, the wavelength of one photon of the entangled pair can be 780 nm, and the other entangled photon wavelength can be 820 nm. In this example, the first dichroic mirror transmits 780 nm photons, and reflect other photon energies. Transmission bandwidths should be less than the photon energy difference. The first optical filter transmits 820 nm photons, and rejects others. The second dichroic mirror transmits at 820 nm, the second optical filter transmits at 780 nm.

If the first detection system detects an 820 nm photon (reflected by the first dichroic mirror and transmitted by the first optical filter), and the second detection system detects a 780 nm photon (reflected by the second dichroic mirror and transmitted by the second optical filter), a bit value of 1 is assigned. In this case, both photons are reflected by the dichroic mirrors, and pass through the optical filters (72 and 80) to the detectors (74 and 82). If both photons are transmitted by the dichroic mirrors (i.e. are transmitted to detectors 70 and 78), a bit value of 0 is assigned.

As with the system described above, photon detection coincidences are defined as measurement events within a predetermined time interval, such as 1 nanosecond.

Numerous other examples will be obvious to those skilled in the art. For example, the definitions of bit 1 and bit 0 can be reversed, other photon wavelengths can be used, and the like.

The stochastic energy based entanglement technique can be adapted for use to generate and detect photon pairs of photon wherein one of the pair strikes a target and the other is detected and measured. In this case, either path emerging from the beam splitter may be modified. For example, the elements 68, 70, 72 and 74 may be omitted and replaced by a target 14, as shown in FIG. 14C. Photon portions entering path 14P will enter the area of the intended target 14. In this embodiment, the detections by elements 82, 78 will be the conjugate of the target influenced part of the photon pair which traverses path 14P.

Entanglement Enhanced Stochastic Quantum Key Distribution (EESQKD) System

Figure 3:
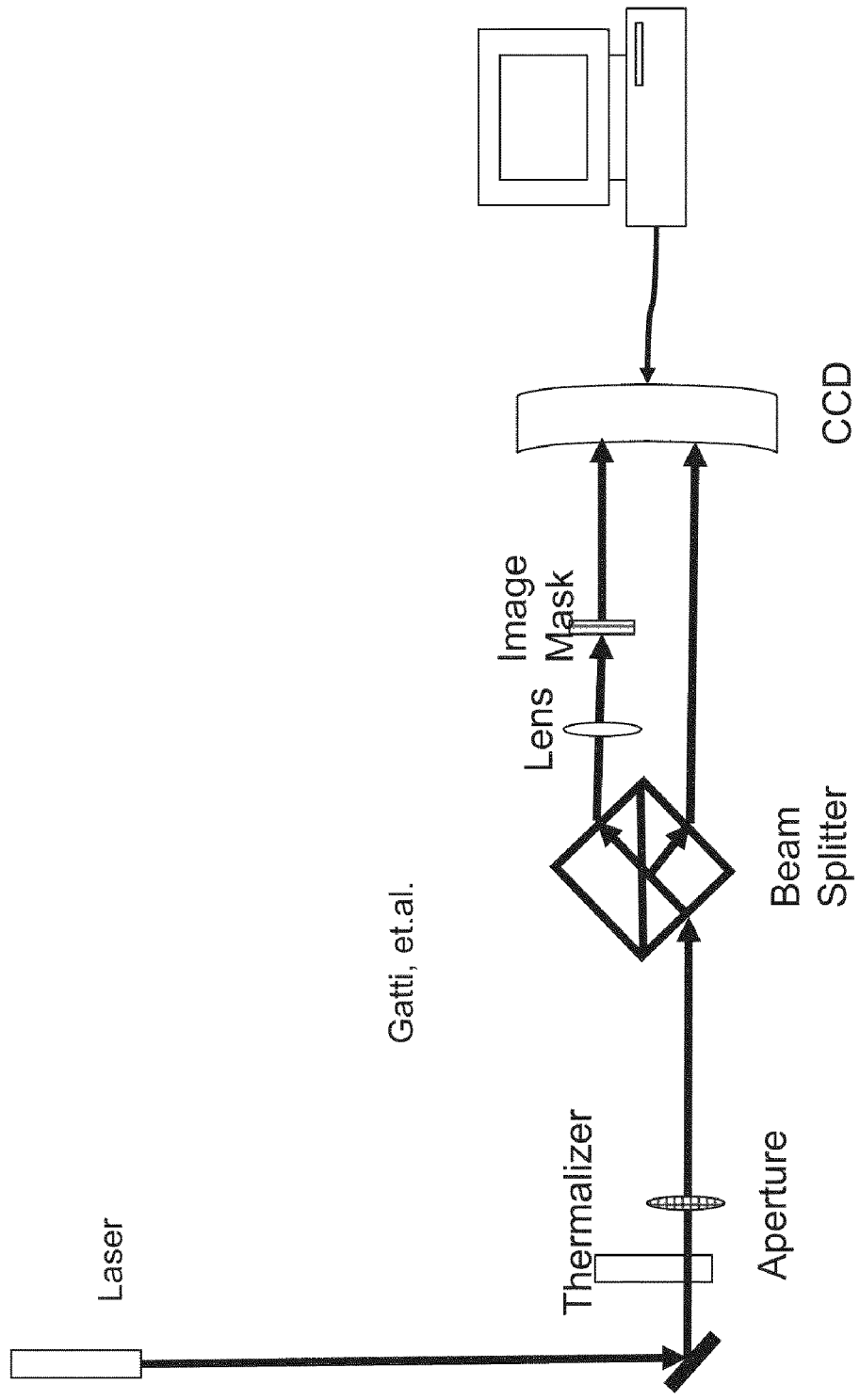
FIG. 3 is a prior art schematic depicting a quantum ghost imaging technique using thermalized light photons and a single CCD.
Figure 14D:
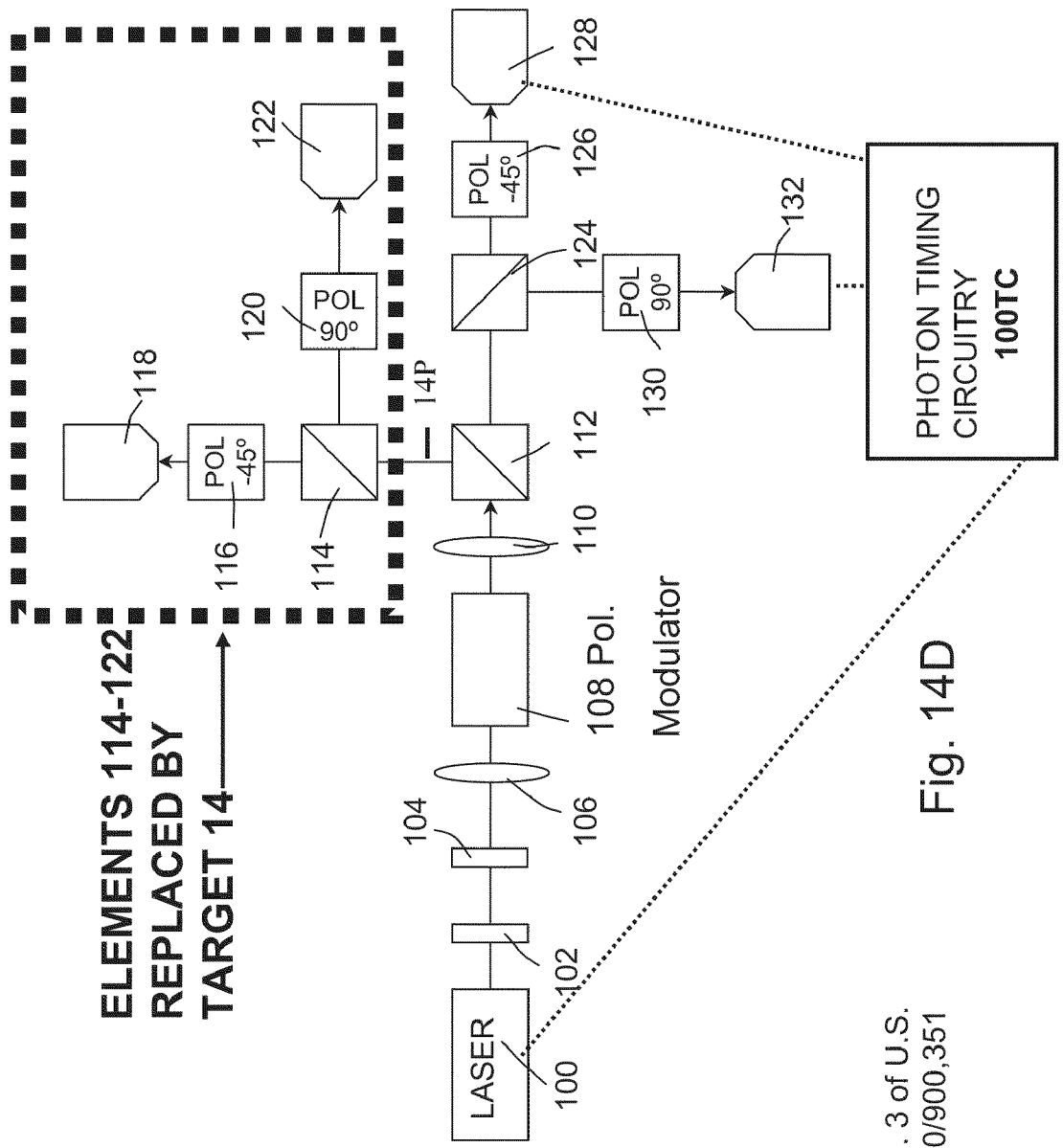
FIG. 14D is a schematic of the Entanglement Enhanced Stochastic Quantum Key Distribution (EESQKD) system.

FIG. 3 of U.S. application Ser. No. 10/900,351 is a schematic of an EESQKD system, which uses entanglement to increase the ratio of detected and counted photons over that of background detected and counted photons. FIG. 14D correlates to FIG. 3 of U.S. application Ser. No. 10/900,351. The system illustrated in FIG. 14 D uses polarization modulation, unlike other systems described which use stochastic (random) time dependent effects.

The sending system comprises a laser 100, nonlinear crystal 102, an optional attenuation filter 104, an optional lens 106, polarization modulator 108, an optional lens 110, and a 50/50 beam-splitter 112.

The remote receiver is in possession of both a first and second detection systems. The first detection system includes a beam-splitter 114, polarizer 116, detector 118, polarizer 120, and detector 122. The second detection system includes a receiver beam-splitter 124, polarizer 126, detector 128, fourth polarizer 130, and fourth detector 132.

Entangled photon pairs are incident on the first receiver beam-splitter, a non-polarizing beam-splitter. Each photon pair consists of a first photon and a second photon, the first photon being directed to the first detection system, the second photon being directed to the second detection system. The first and second receiver beam splitters can be polarizing beam splitters, with output polarizations consistent with the polarizer configuration used. Photons directed to the first detection system can be detected by the first detector 118, at a polarization of −45° as defined by the first polarizer, and at the second detector 122 at a polarization of 90°, as defined by the second polarizer 120. The second detection system operates in a similar pattern, with photons being detected at −45° or 90°.

When the entangled photons arrive at the remote receiver, detection coincidences determine that the photons are from the sender, rather than being stray photons. Hence, signal enhancement is provided by the coincidence measurements. Here, the coincidences detected are between the first detector and the third detector (the two −45° detectors, 118 and 128), or the second detector and the fourth detector (two 90° detectors, 122 and 132), i.e. detection of photon pairs having the same polarization. Coincidental detections can then be used to generate, for example, an encryption key.

Detections can also be correlated with the settings of the polarization modulator, in possession of the sender, using transmissions over a public channel. The detectors used can be single photon counting modules (SPCMs), as described above in relation to FIG. 14B, though other photon counting detectors can be used.

The nonlinear crystal 102 is a type-I crystal. The polarization modulator sets the polarization state of the Type-I SPDC photons. Typically, two polarization states are used, separated by 45°. Using this approach, there is some cost in overall throughput.

In other examples, nearly collinear energy entangled photons released in a stochastic unmodulated form can be sent by the sender to the receiver using two laser sources. The polarizers are set up in a manner consistent with the B92 protocols.

An EESQKD system (and also an HSQKD system) can be used in multiple configurations, including the with or without the use of coincidence timing, and with or without the use of timing pulses for gating.

Consistent with the principles of a preferred embodiment of the present invention, the elements 114-122 may be eliminated and with the path 14P being directed towards a potential target, as depicted in FIG. 14D.

Quantum Imaging Encoded Quantum Imaging System

Figure 4:
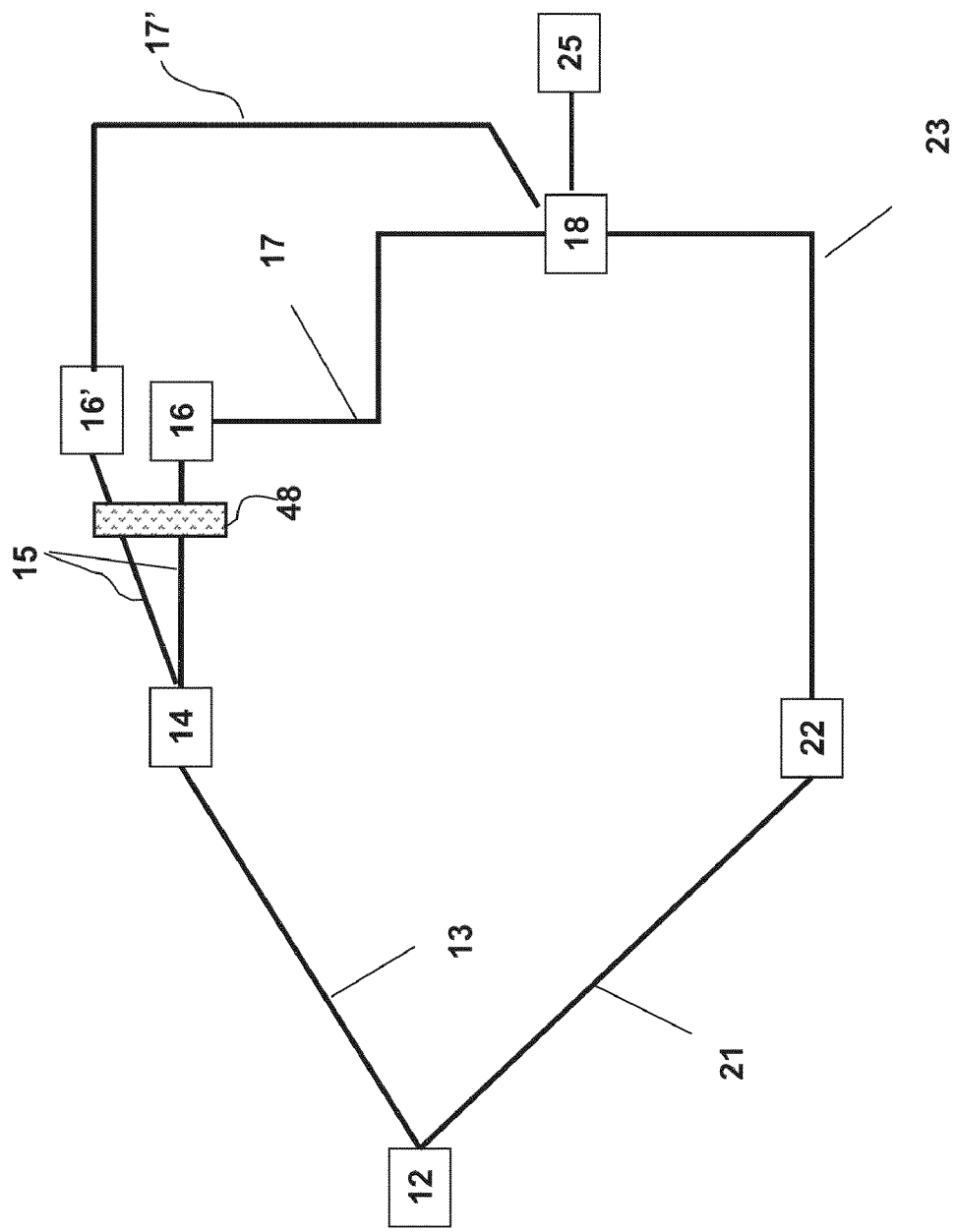
FIG. 4 is a schematic diagram of a generic inventive ghost imaging system.
Figure 14E:
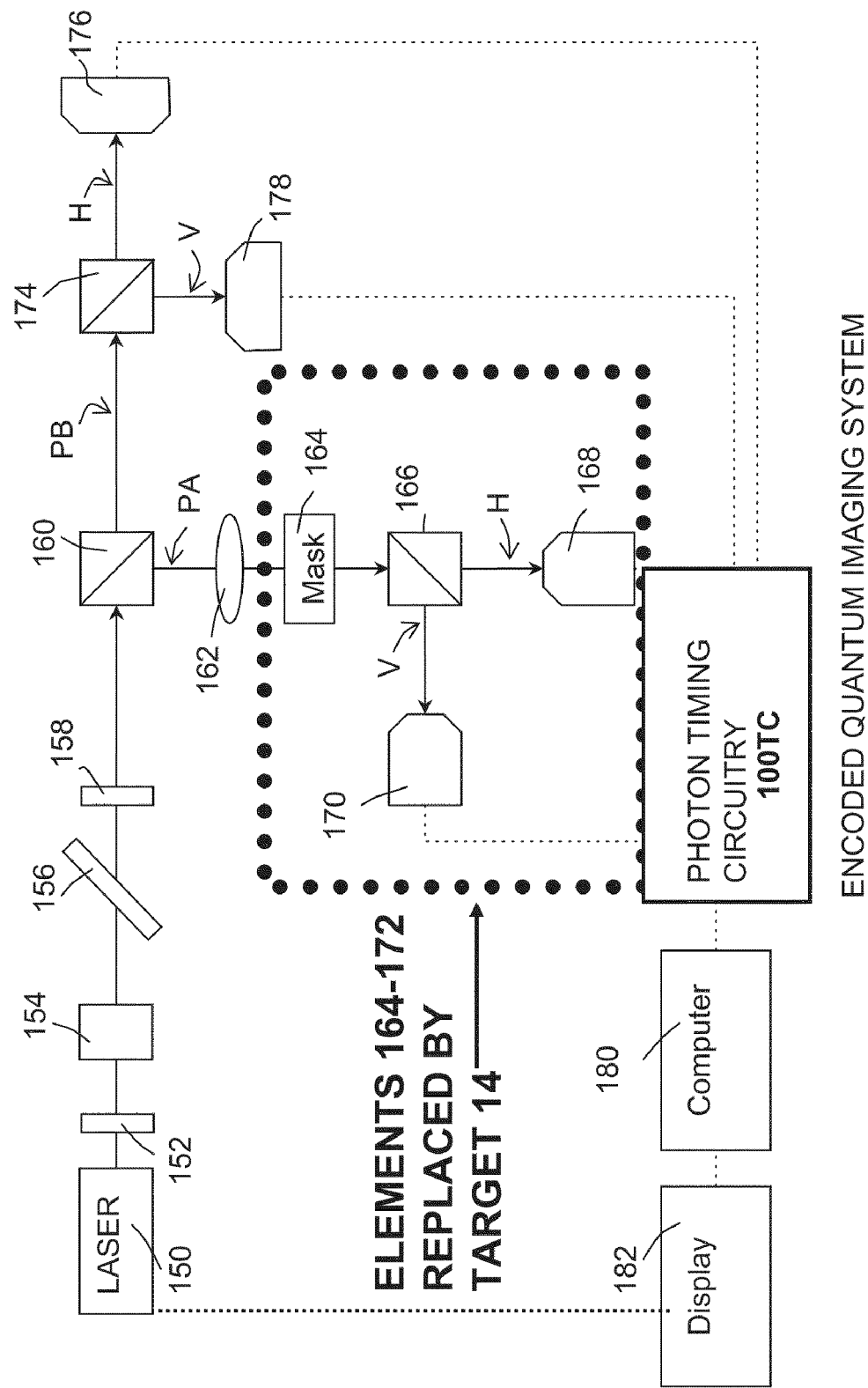
FIG. 14E is a schematic of an Encoded Quantum Imaging system.

FIG. 14E is a schematic of an Encoded Quantum Imaging system and correlates to FIG. 4 of U.S. application Ser. No. 10/900,351, filed on Jul. 28, 2004, hereby incorporated by reference. The quantum imaging system shown in FIG. 14E provides for the imaging of the image mask using entangled photons and coincidence measurements. The sender sends the image of an image mask to the receiver. The system is different from a conventional quantum imaging setup in that polarizing beam-splitters are placed in the path of the photons to provide two channels for each of the sender and receiver of the images.

As shown in FIG. 14E, the system includes a laser 150, nonlinear crystal 152, collimator 154, "mirror to remove fundamental" 156, narrow-band filter 158, a 50/50 beam-splitter 160, image lens 162, image mask 164, polarizing beam-splitter 166, photon detectors 168 & 170, coincidence circuit 172, receiver polarizing beam-splitter 174, scanning fiber tip detectors 176 & 178, computer 180, and image display 182. Dashed lines indicate electronic control, trigger, and detection cabling.

The nonlinear crystal 152 may be a type II crystal, producing entangled photons having orthogonal polarizations. The beam-splitter 160 directs photons to a polarizing beam-splitter on the sender's side (166), which directs horizontally polarized photons (denoted H) to the first photon detector 168, and vertically polarized photons (denoted V) to the second photon detector 170. The beam-splitter 160 also directs photons to a polarizing beam-splitter on the receiver's side (174), which directs horizontally polarized photons (denoted H) to the first scanning fiber tip detector 176, and vertically polarized photons (denoted V) to the second scanning fiber tip detector 178.

In FIG. 14E, the path for photons on side of the sender is denoted PA, and the path on side of the receiver is denoted PB. The receiver receives the image entirely from the photon coincidence measurements composited from the two scanning fiber tips in front of detectors. Fast single photon CCDs can be used in place of the scanning fiber tips 176 and/or 178.

In the embodiment described in U.S. patent Ser. No. 10/900,351, incorporated by reference, the image mask is transmitted by the sender system to the receiver through coincidence measurements. The first scanning and second scanning fiber tip detectors 176 & 178 scan through the received signal, for example under control of the computer 180, and coincidences are established by the coincidence circuit 172. Hence, the image is transmitted directly through coincidence measurements, and the photons transmitting the image information in path PB never encounter the image mask.

Examples of a stochastic quantum key generation are described in U.S. application Ser. No. 10/900,351, incorporated by reference. The embedding of a type of quantum key into quantum image transmission can provide a system for quantum steganography.

In accordance with the principles of the present invention, the mask 164 may be replaced by an intended target 14 and the beam splitter and detectors 168, 170 eliminated. This is represented by a box in FIG. 14E.

Quantum Channel Only Entanglement Imaging

FIG. 14 F correlates to FIG. 5 of U.S. patent Ser. No. 10/900,351, which is a schematic of Quantum Channel Only Entanglement Imaging system. The system includes a laser 200, nonlinear crystal 202, first beam-splitter 204, first lens 206, image mask 208, first half-wave plate 210, second lens 212, first reflector 214, second reflector 216, beam recombiner 218, second half wave plate 220, third mirror 222, second beam-splitter 224, focusing optics 226, single photon detector 228, scanning fiber tip photon detector 228, coincidence circuit 232, and computer with display 234.

The nonlinear crystal is a type I crystal with 0° polarization. A type II crystal could also be used, with suitable system modifications. The first and second beam-splitters (218 and 224) are 50/50 beam-splitters. The beam recombiner 218 is a polarizing beam-splitter. The first half-wave plate 210 rotates the polarization of photons from 0° to 90°, this allows reflection at the beam recombiner 218. The second half-wave plate 220 rotates polarization +/−45°. This reduces the potential for eavesdropping. Without the second half-wave plate, an eavesdropper could insert a polarizing beamsplitter into the transmitted beam to separate out photons that had transmitted through the mask.

In the U.S. patent Ser. No. 10/900,351, the system uses properties of entangled imaging to transmit an image only a quantum channel. There is no classical channel between the sender and the receiver. This layout differs from earlier systems (such as Y. H. Shih, et al., "Two-Photon Geometric Optical Imaging and Quantum 'CryptoFAX'", *Proc. SPIE*, 2799, pp. 164-171 (1996); B. M. Jost, et al., "Spatial correlations of spontaneously down-converted photon pairs detected with a single-photon-sensitive CCD camera", *Optics Express*, 3, pp. 81-87 (1998)) in that instead of a classical and a quantum channel being used to send the information of the image, only a quantum channel is used in this system.

In accordance with a preferred embodiment of the present invention, the elements 164 to 170 could be eliminated.

Figure 14F:
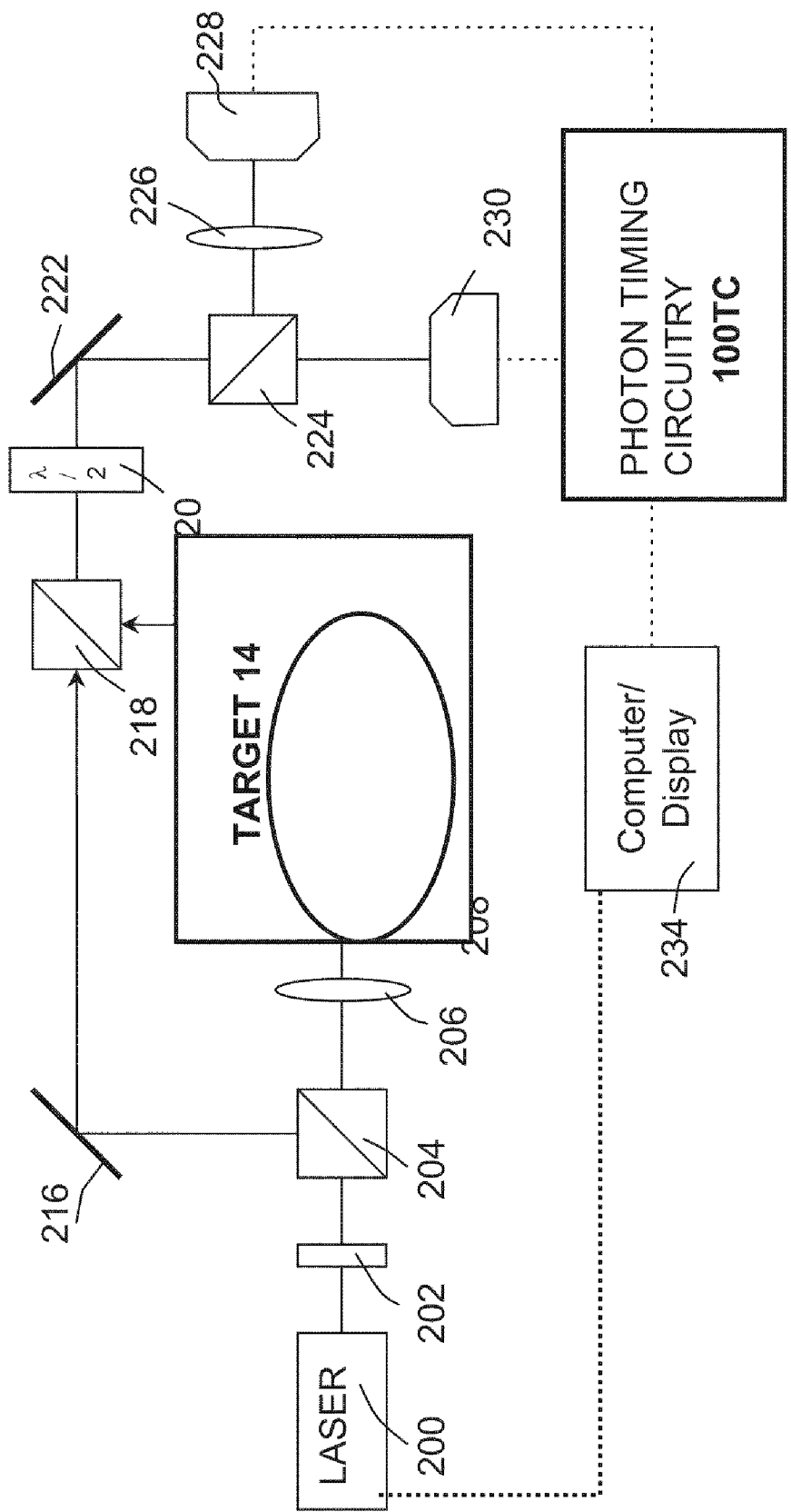
FIG. 14 F is a schematic of Quantum Channel Only Entanglement Imaging system.
Figure 15:
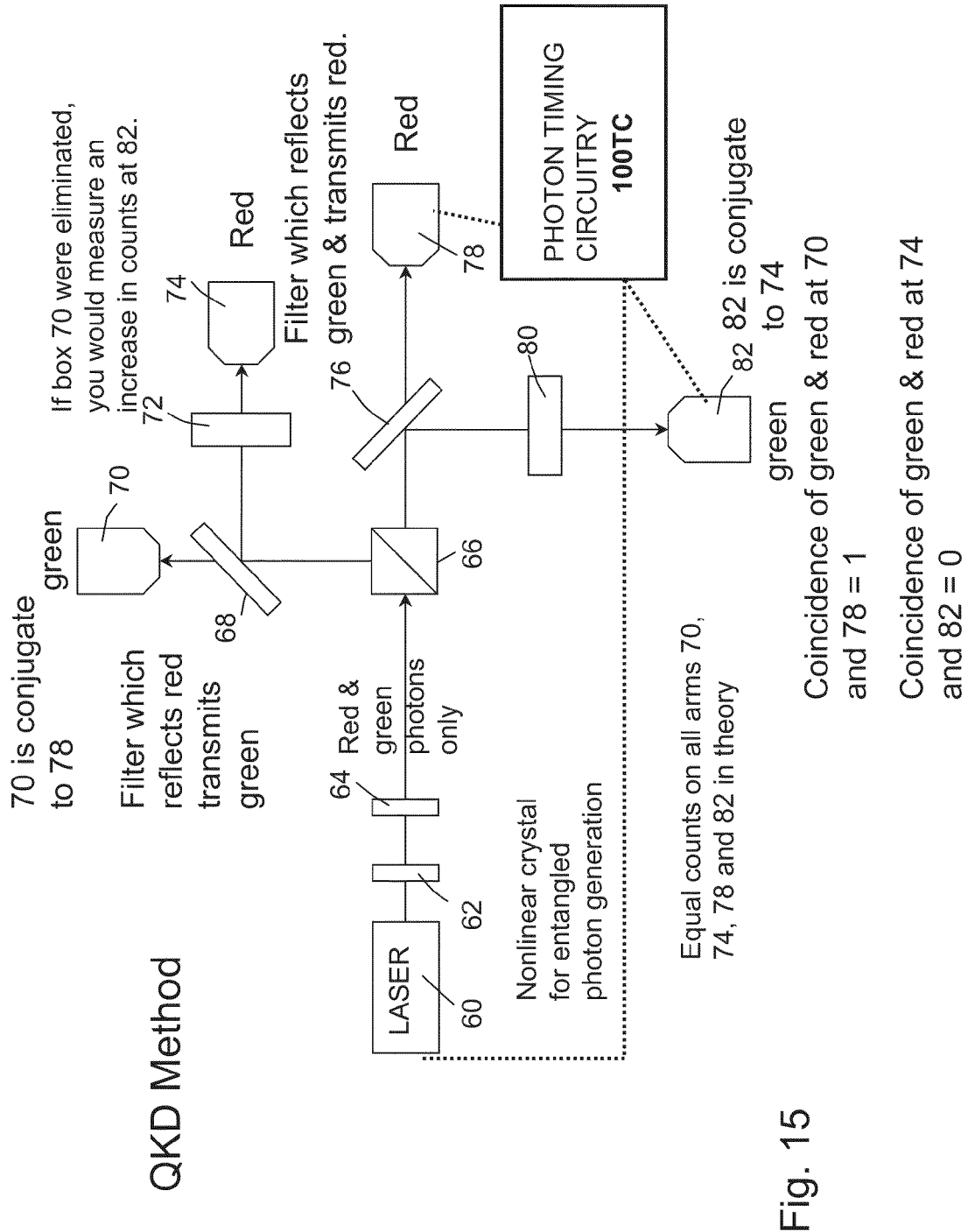
FIG. 15 is an illustration of a preferred embodiment utilizing a beam of red and green photons wherein red and green filters are used in conjunction with the measurement of the results.
Figure 16:
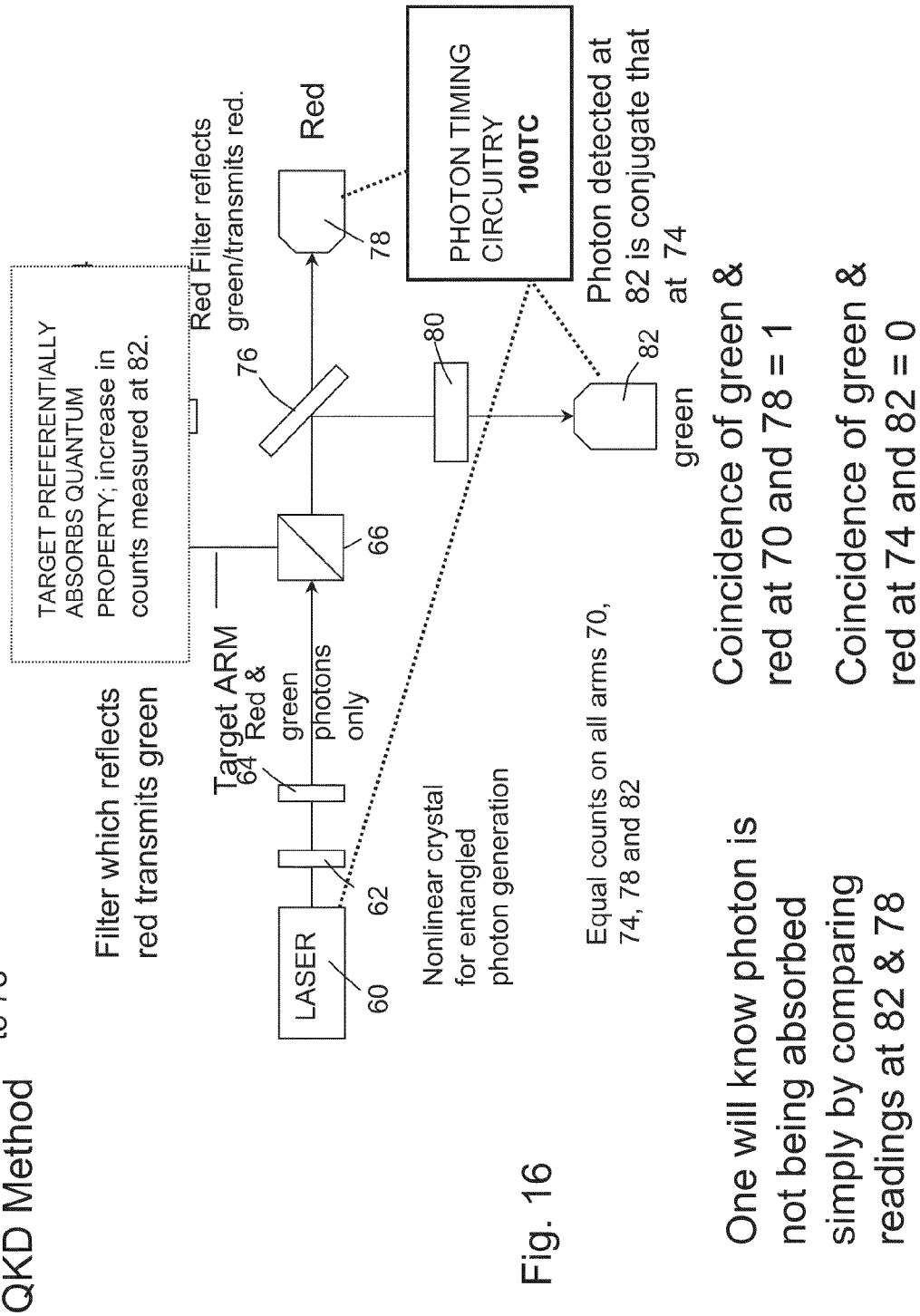
FIG. 16 is an illustration of a preferred embodiment

Instead the path PA shown in FIG. 14F can be directed towards a target 14. The coincidence circuitry could be eliminated. Instead, the time of travel for a given photon to enter the target area will be determined and matched against photons in the reference path or visa versa.

In certain examples discussed above, either Type I nonlinear crystals (for entangled photons having parallel polarizations) or Type II nonlinear crystals (for entangled photons having orthogonal polarizations) were specified. However, it will be obvious to those skilled in the art where the other type of non-linear crystal may be used, with other suitable system modifications.

Patents, provisional patent applications, or publications mentioned in this specification are herein incorporated by reference to the same extent as if each individual publication was specifically and individually indicated to be incorporated by reference. In particular, provisional application 60/493,107, filed Aug. 6, 2003, is incorporated herein in its entirety.

The invention is not restricted to the illustrative examples described above. Examples are not intended as limitations on the scope of the invention. Changes therein, other combinations of elements, and other uses will occur to those skilled in the art.

Ghost Imaging

Ghost imaging may be used to achieve higher resolution than the standard Rayleigh diffraction limit using entangled quantum particles or other forms of radiation referenced herein.

A preferred embodiment of the present invention uses radiation from an entangled light source to generate ghost images. The photons from the light source are divided into two paths. This may be accomplished for example, by a beamsplitter, which is an optical component that allows part of an electromagnetic beam to pass through and reflects the rest. Beamsplitters can be, but are not restricted to, cemented right prisms or partially silvered mirrors In addition, in the case of naturally occurring sunlight, which can be divided into two different paths by other means, beam splitting is unnecessary. For example, in the embodiment shown in FIG. 5A, if the light source 12 is sunlight that radiates in multiple path directions, then the beamsplitter 28 may be omitted.

In a target or object path is the object to be imaged, in the second path (or reference path) images of the entangled, thermal, or chaotic light are measured independent of interaction with the objects. Either or both paths may pass through an obscuring medium. The measurements of the entangled light are then stored for future processing. Instead of collecting photons in the first or object path in a bucket detector and measured, photons in the reference path are correlated to the time it takes a photon to travel to an object site or target location. As used herein, the reference path may contain a photo sensor that collects all the light scattered and incident on it along with spatial information. Measurements from the photo detector are then stored for future processing. A process for solving for the $G^{(2)}$ Glauber coherence between the two correlations is provided to reconstruct the image. The $G^{(2)}$ Glauber coherence between the two correlations is used to generate a correlation two-photon ghost image. One or more spatially addressable detector may be used to generate images from the detection correlations between the time measurement and the CCD detector(s). The resultant "ghost" corresponds to a convolution between the aperture function, or the amplitude distribution function, of the object $A(\rho_o)$ and a δ-function like second-order correlation function $G^{(2)}(\rho_o, \rho_i)$ as provided by Klyshko in Sov. Phys. Usp. 31, 74 (1988); or Phys. Lett. A 132299 (1988):

$$F(\vec{\rho}_i) = \int_{obj} d\vec{\rho}_o A(\vec{\rho}_o) G^{(2)}(\vec{\rho}_o, \vec{\rho}_i) \qquad (1)$$

$$\cong \int_{obj} d\vec{\rho}_o A(\vec{\rho}_o) \delta(\vec{\rho}_o - \vec{\rho}_i/m)_o)$$

The δ-function characterizes a perfect point-to-point relationship between the object plane and the image plane. If the image comes with a constant background the second-order correction function $G^{(2)}(\rho_o, \rho_i)$ in Eq. (1) must be composed of two parts:

$$G^{(2)}(\vec{\rho}_o, \vec{\rho}_i) = G_0 + \delta(\vec{\rho}_o - \vec{\rho}_i/m) \qquad (2)$$

where $G_0$ is a constant. The value of $G_0$ determines the visibility of the image. Examining Eq. (2), one may recognize that this $G^{(2)}$ function can be expressed as:

$$G^{(2)}(\vec{\rho}_o, \vec{\rho}_i) = G_{11}^{(1)}(\vec{\rho}_1, \vec{\rho}_1) G_{22}^{(1)}(\vec{\rho}_2, \vec{\rho}_2) + G_{12}^{(1)}(\vec{\rho}_1, \vec{\rho}_2) G_{21}^{(1)}(\vec{\rho}_2, \vec{\rho}_1) \qquad (3)$$

where $G_{11}^{(1)} G_{22}^{(1)}$ is approximately equal to $G_0$ and $G_0$ is a constant, and $G_{12}^{(1)} G_{21}^{(1)}$ is approximately equal to $\delta(\vec{\rho}_1 - \vec{\rho}_2)$ where $\delta(\vec{\rho}_1 - \vec{\rho}_2)$ represents the δ-function non-local position-position correlation; and $\rho_1$ and $\rho_2$ are the transverse spatial coordinates of the first and second detectors respectively and where the effect of the object at $\rho_1$ is derived from the ratios and/or differences and/or products and sums of the photon properties measured at $\rho_2$ in lieu of recorded measurements in the terms $G_{11}^{(1)}$ and $G_{12}^{(1)} G_{21}^{(1)}$ at location $\rho_1$. Note that the superscript of the $G^{(n)}$ functions indicates the order (n) of the correlation of the measurements, and is not a reference or a footnote.

An imaging system is shown in FIGS. 4, 5A, 6, 7A, 8A, 8B, 9, and 10 where like reference numerals used among the FIGS. have like meaning. Light source 12 represents an entangled photon beam that is operative in an air medium. An object 14 receives a light source output 13 and effectively takes a measurement (i.e. absorbs or reflects light) along path 15. In accordance with the principles of the present invention, the reflected light output 15 is not measured. Instead the time of travel of the photon is computed and correlated to the photon in the reference path or visa versa. In this preferred embodiment, correlation computation subsystem 18 relates the time the photon takes to be absorbed or influenced by the target and correlates it to the time of photon travel in the reference path. Paths 17, 17' and 23 may utilize any form of a data route, such as a wire, radio frequency (RF) transmission field, or an optical path. Output 21 from a beam splitter 28 is collected by a spatially addressable detector 22, which may be, e.g., a CMOS, CCD (charge coupled device array and/or scanning fiber tip), that is observing the source 12 for the same time as that calculated for the photon travel to the target area. The spatially addressable intensity values are transmitted via path 23 to the correlation computation subsystem 18, which may include a computer, processor, etc. Subsystem 18, computes the correlation quantum ghost image in accordance with Equation 3 above, utilizing the input values from paths 17 and 23, and displays a correlated two-photon quantum image on a monitor 25, as shown in FIG. 4.

An object 14, in addition to being a three-dimensional opaque object, the object 14 may also be a semi-opaque or opaque mask from which scattered and reflected information can be collected from the reference photon. An example of this opaque mask is found in U.S. patent application Ser. No. 10/900,351, hereby incorporated by reference as though fully rewritten herein. The reference photon thereby acts as an ancilla which may be saved for a time period equal to that over which the reflecting or scattering photon takes to merge into the photon stream. The term ancilla as used herein refers to a unit of ancillary information utilized for an addition check or verification. The existence of the entangled photon pair in the merge stream (as shown in FIG. 5 of U.S. patent application Ser. No. 10/900,351, between elements 218 and 220) is indicative that one of the entangled photons of the pair has reflected or scattered from the object and thereby identifies the existence of the object. A significant number of entangled photon pairs provide ghost image data as to the shape of the object, which is determined from the entangled photon pair measurement according to the present invention.

A ghost image is the result of a convolution between the aperture function (amplitude distribution function) of the object $A(\vec{\rho}_o)$ and a $\delta$-function like second-order correlation function $G^{(2)}(\vec{\rho}_o, \vec{\rho}_i)$ $$F(\vec{\rho}_i) = \int_{obj} d\vec{\rho}_o A(\vec{\rho}_o) G^{(2)}(\vec{\rho}_o, \vec{\rho}_i), \quad (1)$$

where $G^{(2)}(\vec{\rho}_o, \vec{\rho}_i) \cong \delta(\vec{\rho}_o - \vec{\rho}_i/m)$, $\vec{\rho}_o$ and $\vec{\rho}_i$ are 2D vectors of the transverse coordinate in the object plane and the image plane, respectively, and m is the magnification factor. The term $\delta$ function as used herein relates to the Dirac delta function which is a mathematical construct representing an infinitely sharp peak bounding unit area expressed as $\delta(x)$, that has the value zero everywhere except at x=0 where its value is infinitely large in such a way that its total integral is 1. The $\delta$ function characterizes the perfect point-to-point relationship between the object plane and the image plane. If the image comes with a constant background, as in this experiment, the second-order correlation function $G^{(2)}(\vec{\rho}_o, \vec{\rho}_i)$ in Eq. (1) must be composed of two parts $$G^{(2)}(\vec{\rho}_o, \vec{\rho}_i) = G_0 + \delta(\vec{\rho}_o - \vec{\rho}_i/m), \quad (2)$$

where $G_0$ is a constant. The value of $G_0$ determines the visibility of the image. One may immediately connect Eq. (2) with the $G^{(2)}$ function of thermal radiation $$G^{(2)} = G_{11}^{(1)} G_{22}^{(1)} + |G_{12}^{(1)}|^2, \quad (3)$$

where $G_{11}^{(1)} G_{22}^{(1)} \sim G_0$ is a constant, and $|G_{12}^{(1)}|^2 \sim \delta(\vec{\rho}_1 - \vec{\rho}_2)$ represents a nonlocal position-to-position correlation. Although the second-order correlation function $G^{(2)}$ is formally written in terms of $G^{(1)}$s as shown in equation (3), the physics are completely different. As we know, $G_{12}^{(1)}$ is usually measured by one photodetector representing the first-order coherence of the field, i.e., the ability of observing first-order interference. Here, in Eq. (3), $G_{12}^{(1)}$ is measured by two independent photodetectors at distant space-time points and represents a nonlocal EPR correlation.

Differing from the phenomenological classical theory of intensity-intensity correlation, the quantum theory of joint photodetection, known conventionally as Glauber's theory and published in Phys. Rev. 130, 2529 (1963); and Phys. Rev. 131, 2766 (1963) dips into the physical origin of the phenomenon. The theory gives the probability of a specified joint photodetection event $$G^{(2)} = Tr[\hat{\rho} E^{(-)}(\vec{\rho}_1) E^{(-)}(\vec{\rho}_2) E^{(+)}(\vec{\rho}_2) E^{(+)}(\vec{\rho}_1)], \quad (4)$$

and leaves room for us to identify the superposed probability amplitudes. In Eq. (4), $E^{(-)}$ and $E^{(+)}$ are the negative and positive-frequency field operators at space-time coordinates of the photodetection event and $\hat{\rho}$ represents the density operator describing the radiation. In Eq. (4), we have simplified the calculation to 2D.

In the photon counting regime, it is reasonable to model the thermal light in terms of single-photon states for joint detection, $$\hat{\rho} \simeq |0\rangle\langle 0| + |\epsilon|^4 \sum_{\vec{\kappa}} \sum_{\vec{\kappa}'} \hat{a}^\dagger(\vec{\kappa}) \hat{a}^\dagger(\vec{\kappa}') |0\rangle\langle 0| \hat{a}(\vec{\kappa}') \hat{a}(\vec{\kappa}), \quad (5)$$

where $|\epsilon| \ll 1$. Basically, we model the state of thermal radiation, which results in a detection event, as a statistical mixture of two photons with equal probability of having any transverse momentum $\vec{\kappa}$ and $\vec{\kappa}'$. Analogous calculations can be made for entangled photons.

Assuming a large number of atoms that are ready for two-level atomic transition. At most times, the atoms are in their ground state. There is, however, a small chance for each atom to be excited to a higher energy level and later release a photon during an atomic transition from the higher energy level $E_2$ ($\Delta E_2 \neq 0$) back to the ground state $E_1$. It is reasonable to assume that each atomic transition excites the field into the following state:

$$|\Psi\rangle \simeq |0\rangle + \epsilon \sum_{k,s} f(k,s) \hat{a}^\dagger_{k,s} |0\rangle,$$

where $|\epsilon| \ll 1$ is the probability amplitude for the atomic transition. Within the atomic transition, $f(k,s) = \langle \psi_{k,s} | \psi \rangle$ is the probability amplitude for the radiation field to be in the single-photon state of wave number k and polarization $$s: |\psi_{k,s}\rangle = |1_{k,s}\rangle = \hat{a}^\dagger_{k,s} |0\rangle.$$

For this simplified two-level system, the density matrix that characterizes the state of the radiation field excited by a large number of possible atomic transitions is thus $$\hat{\rho} = \prod_{t_{0j}} \left\{ |0\rangle + \epsilon \sum_{k,s} f(k,s) e^{-i\omega t_{0j}} \hat{a}^\dagger_{k,s} |0\rangle \right\} \times$$

$$\prod_{t_{0k}} \left\{ \langle 0| + \epsilon^* \sum_{k',s'} f(k',s') e^{i\omega' t_{0k}} \langle 0| \hat{a}_{k',s'} \right\}$$

$$\simeq \left\{ |0\rangle + \epsilon \left[ \sum_{t_{0j}} \sum_{k,s} f(k,s) e^{-i\omega t_{0j}} \hat{a}^\dagger_{k,s} |0\rangle \right] + \epsilon^2 [\ldots] \right\} \times$$

$$\left\{ \langle 0| + \epsilon^* \left[ \sum_{t_{0j}} \sum_{k',s'} f(k',s') e^{i\omega' t_{0k}} \langle 0| \hat{a}_{k',s'} \right] + \epsilon^{*2} [\ldots] \right\},$$

where $e^{-i\omega t_{0j}}$ is a random phase factor associated with the state $|\psi\rangle$ of the jth atomic transition. Summing over $t_{0j}$ and $t_{0k}$ by taking all possible values, we find the approximation to the fourth order of $|\epsilon|$, $$\hat{\rho} \simeq |0\rangle\langle 0| + |\epsilon|^2 \sum_{k,s} |f(k,s)|^2 |l_{k,s}\rangle\langle l_{k,s}| +$$

$$|\epsilon|^4 \sum_{k,s} \sum_{k',s'} |f(k,s)|^2 |f(k',s')|^2 |l_{k,s} l_{k',s'}\rangle\langle l_{k,s} l_{k',s'}|.$$

The second-order transverse spatial correlation function is thus $$G^{(2)}(\vec{\rho}_1, \vec{\rho}_2) = \sum_{\vec{\kappa}, \vec{\kappa}'} |\langle 0|E_2^{(+)}(\vec{\rho}_2)E_1^{(+)}(\vec{\rho}_1)|I_{\vec{\kappa}} I_{\vec{\kappa}'}\rangle|^2. \quad (6)$$

The electric field operator, in terms of the transverse mode and coordinates, can be written as follows:

$$E_j^{(+)}(\vec{\rho}_j) \propto \sum_{\vec{\kappa}} g_j(\vec{\kappa}; \vec{\rho}_j) \hat{a}(\vec{\kappa}), \quad (7)$$

where $\hat{a}_{\vec{\kappa}}$ is the annihilation operator for the mode corresponding to $\vec{\kappa}$ and $g_j(\vec{\rho}_j; \vec{\kappa})$ is the Green's function associated with the propagation of the field from the source to the jth detector [23]. Substituting the field operators into Eq. (6), we obtain $$G^{(2)}(\vec{\rho}_1, \vec{\rho}_2) = \sum_{\vec{\kappa}, \vec{\kappa}'} |g_2(\vec{\kappa}; \vec{\rho}_2)g_1(\vec{\kappa}'; \vec{\rho}_1) + g_2(\vec{\kappa}'; \vec{\rho}_2)g_1(\vec{\kappa}; \vec{\rho}_1)|^2. \quad (8)$$

Eq. (8) indicates a two-photon superposition. The superposition happens between two different yet indistinguishable Feynman alternatives that lead to a joint photodetection: (1) photon $\vec{\kappa}$ and photon $\vec{\kappa}'$ are annihilated at $\vec{\rho}_2$ and $\vec{\rho}_1$, respectively, and (2) photon $\vec{\kappa}'$ and photon $\vec{\kappa}$ are annihilated at $\vec{\rho}_2$ and $\vec{\rho}_1$, respectively. The interference phenomenon is not, as in classical optics, due to the superposition of electromagnetic fields at a local point of space time. It is due to the superposition of $g_2(\vec{\kappa}; \vec{\rho}_2)g_1(\vec{\kappa}'; \vec{\rho}_1)$ and $g_2(\vec{\kappa}'; \vec{\rho}_2)g_1(\vec{\kappa}; \vec{\rho}_1)$, the so-called two-photon amplitudes.

Completing the normal square of Eq. (8), it is easy to find that the sum of the normal square terms corresponding to the constant of $G_0$ in Eq. (2): $\Sigma_{\vec{\kappa}} |g_1(\vec{\kappa}; \vec{\rho}_1)|^2 \Sigma_{\vec{\kappa}'} |g_2(\vec{\kappa}'; \vec{\rho}_2)|^2 = G_{11}^{(1)} G_{22}^{(1)}$, and the cross term $|\Sigma_{\vec{\kappa}} g_1^*(\vec{\kappa}; \vec{\rho}_1)g_2(\vec{\kappa}; \vec{\rho}_2)|^2 = |G_{12}^{(1)}(\vec{\rho}_1, \vec{\rho}_2)|^2$ gives the δ function of position-position correlation where $$\left|\int d\vec{\kappa} g_1^*(\vec{\kappa}; \vec{\rho}_1)g_2(\vec{\kappa}; \vec{\rho}_2)\right|^2 \simeq |\delta(\vec{\rho}_o + \vec{\rho}_i)|^2, \quad (9)$$

$$g_1(\vec{\kappa}; \vec{\rho}_o) \propto \Psi\left(\vec{\kappa}, -\frac{c}{\omega} d_A\right) e^{i\vec{\kappa}\vec{\rho}_o}, \quad (10)$$

$$g_2(\vec{\kappa}; \vec{\rho}_i) \propto \Psi\left(\vec{\kappa}, -\frac{c}{\omega} d_B\right) e^{i\vec{\kappa}\vec{\rho}_i},$$

are the Green's functions propagated from the radiation source to the transverse planes of $d_A$ and $d_B = d_A$. In Eq. (11), $\psi(\omega d/c)$ is a phase factor representing the optical transfer function of the linear system under the Fresnel near-field paraxial approximation, ω is the frequency of the radiation field, and c is the speed of light.

Substituting this δ function together with the constant $G_0$ into Eq. (1), an equal sized lensless image of $A(\vec{\rho}_o)$ is observed in the joint detection between the CCD array and the photon counting detector $D_1$. The visibility of the image is determined by the value of $G_0$.

The inventive ghost images are thus successfully interpreted as the result of two-photon interference. The two-photon interference results in a point-point correlation between the object plane and the image plane and yields a ghost image of the object by means of joint photodetection.

An inventive imaging system is depicted generically in FIG. 4 and in exemplary actual imaging systems in FIGS. 5A, 6, 7A, 8A, 8B, 9, and 10 where like reference numerals used among the FIGS. have like meaning. The optional detector 16" is omitted from FIGS. 5A, 6, 7A, 8A, 8B, 9, and 10 for visual clarity. A light source 12 is provided to emit photons. A light source 12 operative in this embodiment provides quantum entangled photons or thermal photons and illustratively includes sunlight, thermalized laser light (partially coherent or chaotic), an artificial incoherent light source such as an incandescent light bulb, or an entangled photon source. This embodiment may be practiced with an partially coherent, chaotic, incoherent or entangled light sources. The media through which photons emitted from the light source 12 travel includes air, water, and the vacuum of space, as well as evacuated light paths produced within a laboratory. A first portion of photons 13 emitted from the light source 12 contact an object 14 to be imaged. The photons 13 are influenced by reflected from the object 14 along light path 15. A spatially integrated detector 16 receives photons 15 for a period of time. The detector 16 integrates the received photons for the period of time to yield a bucket detector signal 17 that corresponds to integrated values of photonic intensity. The signal 17 is conveyed to a computer 18. A second portion of photonic light emission 21 from the light source 12 is received at a second spatially addressable detector 22 aimed at the light source 12. The second light emission portion 21 reaches the second detector 22 independent of interaction with the object. The detector 22 collects the emission 21 for a second period of time. To facilitate computation of a ghost image, preferably the integration period of time for the photon to enter the target area first detector 16 and the integration second period of time for the second detector 22 are the same. A trigger signal is conveyed from the computer 18 to initiate photon collection by the detectors, 16 and 22 and if present 16'. A spatially resolved signal 23 corresponding to spatially addressable intensity values for the emission 21 contacting the detector 22 are also conveyed to the computer 18. The computer 18 computes a two-photon correlation ghost image in accordance with Eq. (3) from the transmission time (or photon travel time) the bucket detector signal 17 and the spatially resolved signal 23. A correlated photon quantum image is displayed on a monitor 25.

Each of the detectors 16 or 22 is illustratively, e.g., a single photon counting detector, light intensity detector, or a charge couple device. In the instance when both detectors 16 and 22 are charge coupled devices, this affords the additional feature of being able to modify the sensitivity of specific detector pixels on the bucket detector 22 16 prior to producing the bucket detector signal 17. In this way, a ghost image may be impressed by either turning off or turning on certain pixels in the shape of the object to be imaged prior to summation of the total number of photon counts impingent upon the charge couple device detector 2216. It is further appreciated that pixels may be partially or fully sensitized to provide grayscales of an image which further can be modified with artificial color to provide still additional imaging detail.

FIG. 5A is a schematic illustration showing radiation from an entangled photon chaotic pseudothermal source 12 divided into two paths by a nonpolarizing beam splitter 26. In arm A, an object 14 is illuminated by the light source at a distance of $d_A$. A bucket detector 16 is used to collect and to count the photons that are reflected from the surface of the object. In arm B, a second spatially addressable detector 22 is deployed. A detector 22 includes a two-dimensional (2D) photon counting CCD array, cooled for single-photon detection, and may optionally include a lens. The detector 22 is placed at any given distance $d_B$. As shown in FIG. 5A, $d_A = d_B$. It is appreciated that the present invention is operative when $d_B$ does not equal $d_A$, but may be calculated knowing the speed of light and the time of travel. The detector 22 faces the light source instead of facing the object 14. The bucket detector 16 is simulated by using a large area silicon photodiode for collecting the randomly scattered and reflected photons from the object 14. A triggering pulse from a computer is used to synchronize the measurements at 16 and 22 for two-photon joint detection. The time window is preferably chosen to match the coherent time of the radiation to simplify computation. The light intensity is also preferably chosen for each element of the detector 22 working at a single-photon level within the period of detector element response time. The chaotic light 12 is simulated by transmitting a laser beam first through a lens to widen the beam and then through a phase screen made from rotating ground glass. Meyers and colleagues in J. Mod. Opt. 54, 2381 (2007) hereby incorporated by reference, have shown that a large transverse sized source gives better spatial resolution of the two-photon image.

Figure 5B:
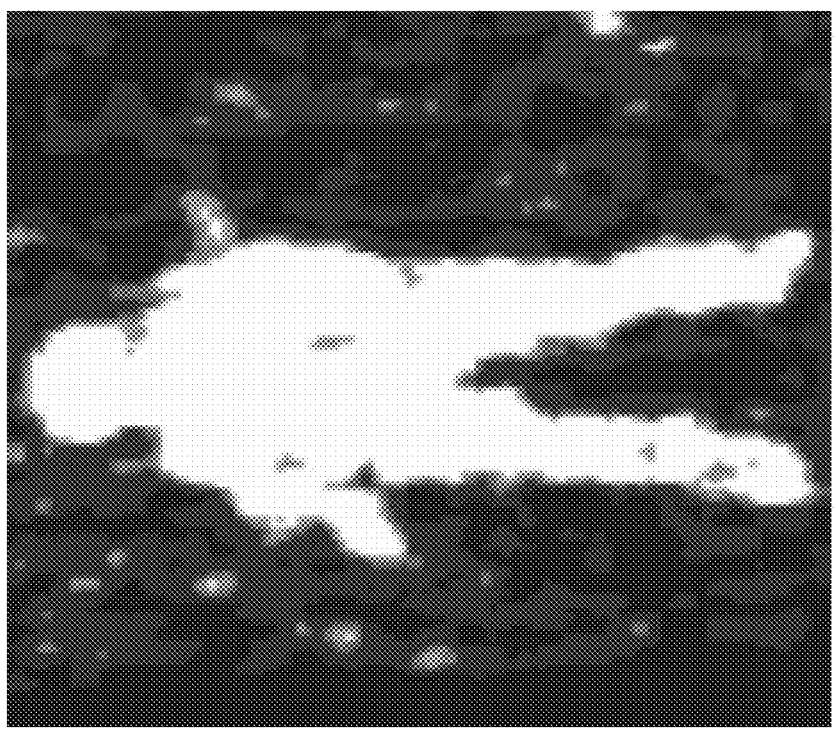
FIG. 5B is an actual ghost image display of an object from the scheme of FIG. 5A.

In FIG. 5A, the specific object 14 is a toy soldier. Additionally, FIG. 5A depicts electronic circuitry components of the computer 18 relative to the detectors 16 and 22. A coincidence circuit 28 provides detection coordination between detectors 16 and 22. A photon registration history for detector 16 is also provided at 30 and provides a temporal log for the integrated values 17 transmitted to the computer 18. The second spatially addressable detector 22 is provided with spatially addressable output 32 that is subsequently fed to computer 18 and onto display 25. For the optical bench schematic of FIG. 5A, the actual ghost image display on a monitor 25 is provided in FIG. 5B and is discernable as the original toy FIGS. It is appreciated that the image quality shown in FIG. 5B is improved by increasing photon flux along path 15.

Figure 6:
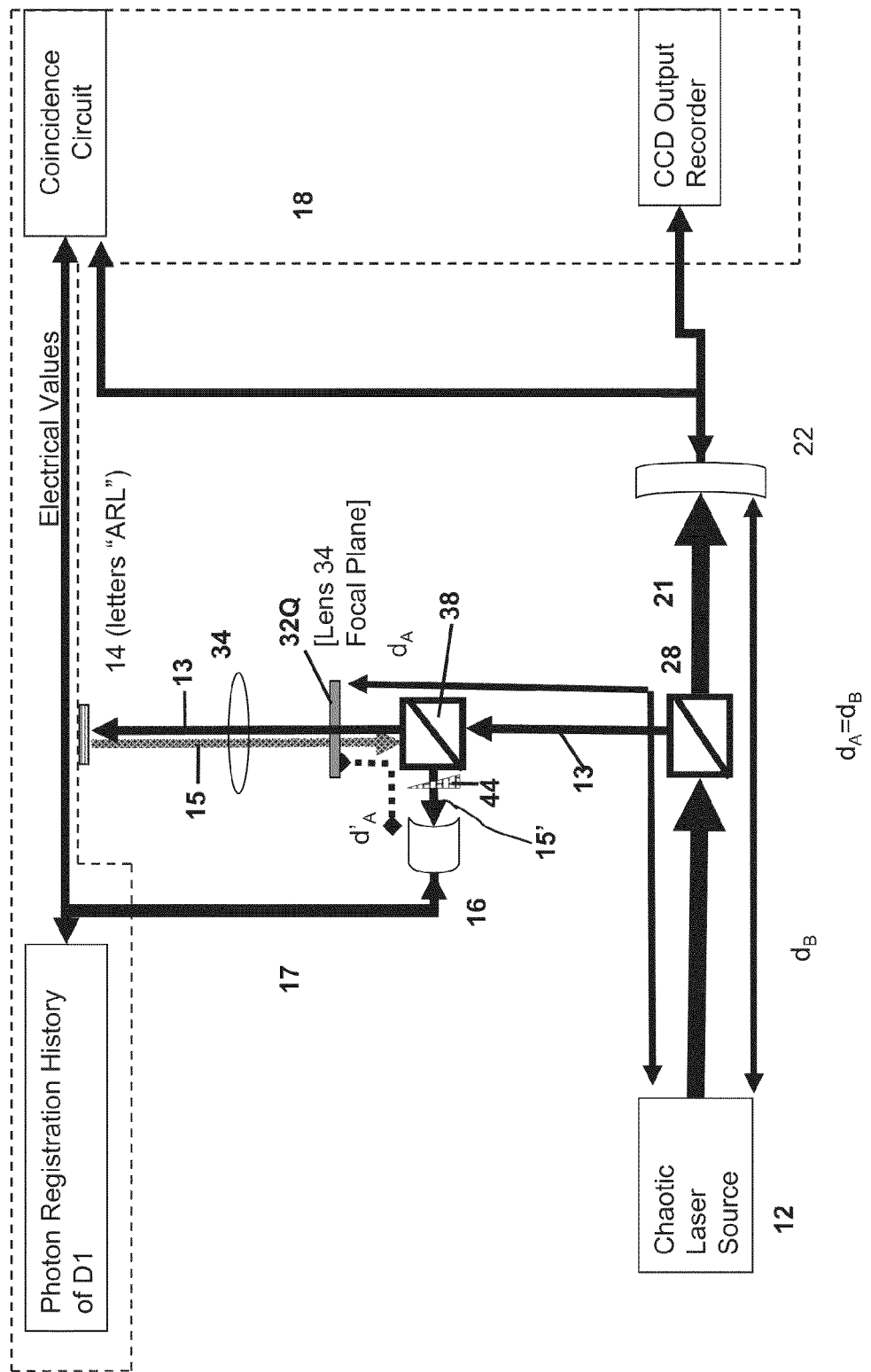
FIG. 6 is a schematic of an inventive quantum ghost imaging scheme using a lens to focus light reflected from a remote object.

FIG. 6 is a schematic of a ghost imaging scheme using a lens 34 to focus reflected light 15 from the object 14 to improve ghost image quality. Elements 28 and 38 are beam splitters and the focal plane of lens 34 is depicted as 32Q. The lens 34 is provided in the optical path such that optical path 13 (the light path of incident light to the object 14) and reflected light path 15 (from the object back to the beam splitter 28A) may be coextensive. The lens 34 has a focal point spatially removed from the detector 16 by a distance $d'_A$ and constitutes a corrective optical component. A beam splitter 38 otherwise similar to beam splitter 28 is also used to provide optical registry. The inclusion of a monochromometer 44 intermediate along the merge photon path 15' allows one to determine the spectroscopic properties of an object if entangled photon pairs of differing energies are used. Such spectroscopic information is helpful in determining the chemical composition of the object surface.

FIG. 7 is a schematic of an inventive ghost imaging scheme lacking a lens yet still providing coextensive optical paths 13 and 15 where like numerals correspond to those used with respect to FIG. 6. FIGS. 7B-7D show successive single frame output from the detector 23 (FIG. 7B), integrated output from detector 23 (FIG. 7C) and a ghost image as detected on monitor 25 upon combination of signals 17 and 23 (FIG. 7D). A phase screen 40 is provided as a corrective optical component intermediate between beam splitter 26 and detector 22. A suitable phase screen 40 operative herein includes, for example, a transmissive liquid crystal display.

Figure 7A:
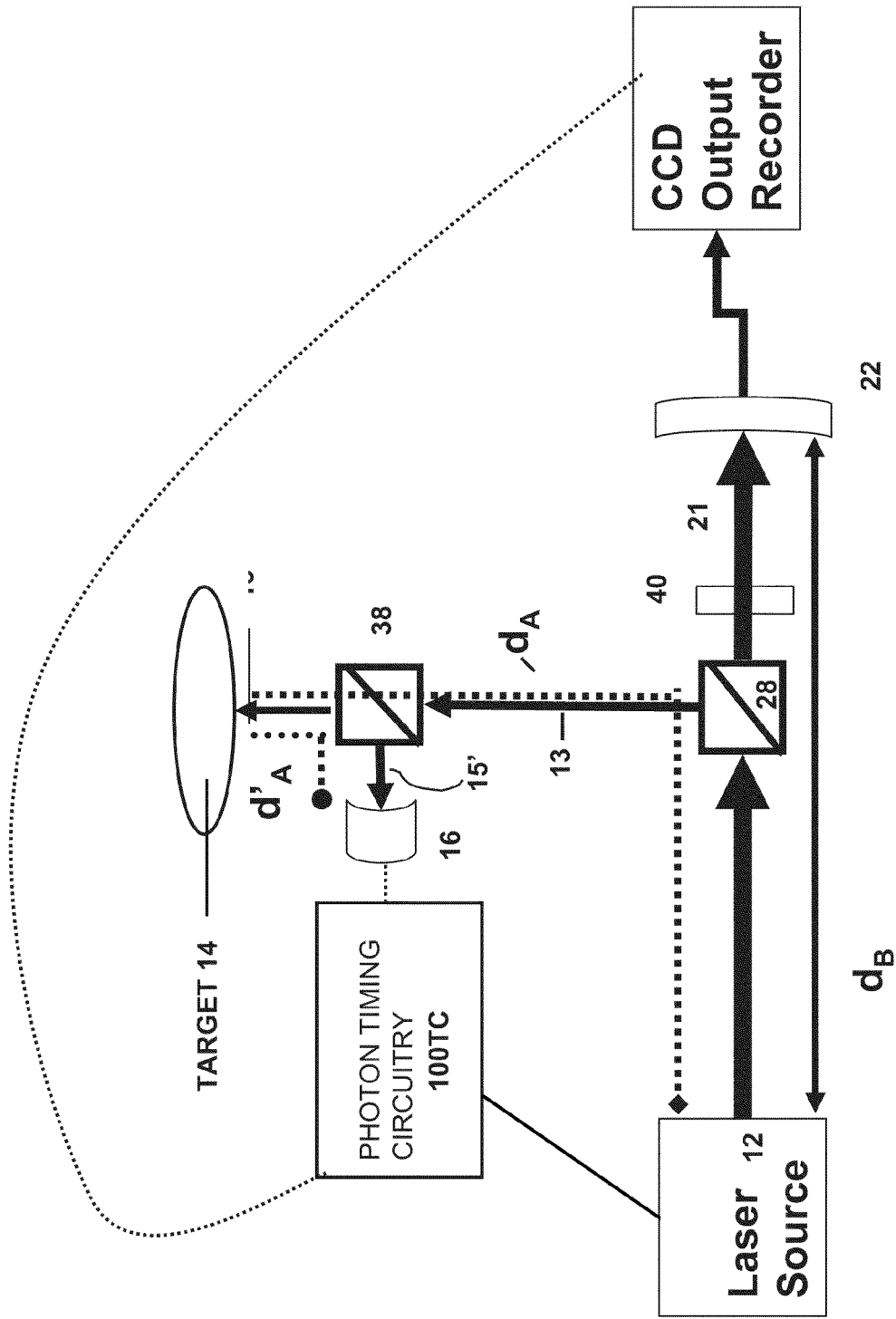
FIG. 7A is a schematic of an inventive lens-less quantum ghost imaging scheme using light reflected from an object.
Figure 7B:
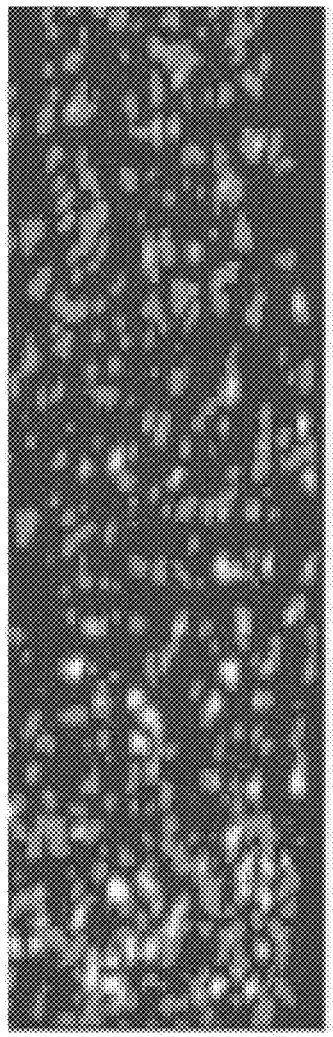
FIG. 7B is single frame CCD output; the "speckles" indicate typical random photodetection events.
Figure 7C:
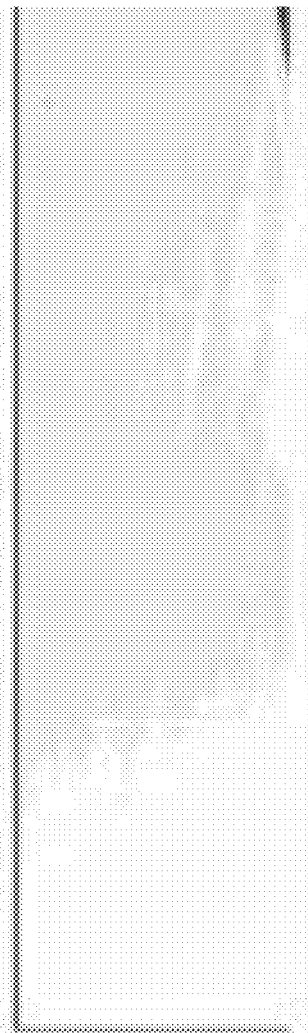
FIG. 7C is time averaged CCD output of a few hundred frames.
Figure 7D:
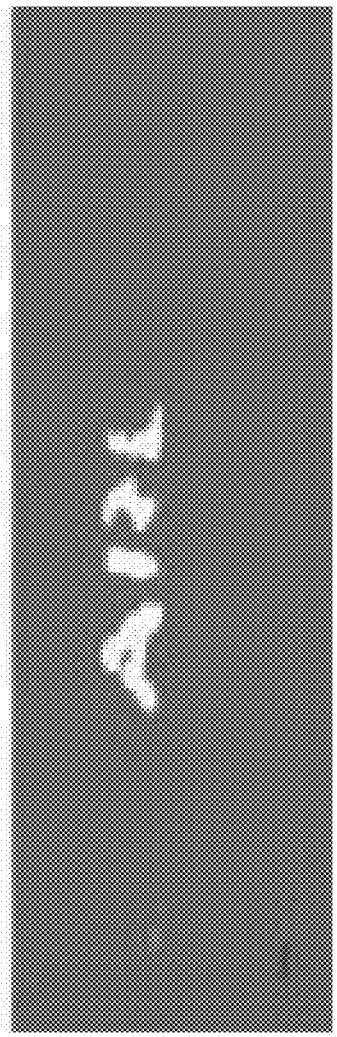
FIG. 7D is a ghost image CCD-$D_1$ joint detection.

It is appreciated that the optical schematics of FIGS. 6 and 7A are particularly well suited for instances when the photons 21 or 13 emitted by the light source 12 represent a stimulating incident light and reflected photons 15 from the object 14 are stimulated fluorescence light. It is appreciated that the stimulated fluorescence light in such instances is of a longer wavelength than the instant photons 13.

Figure 8A:
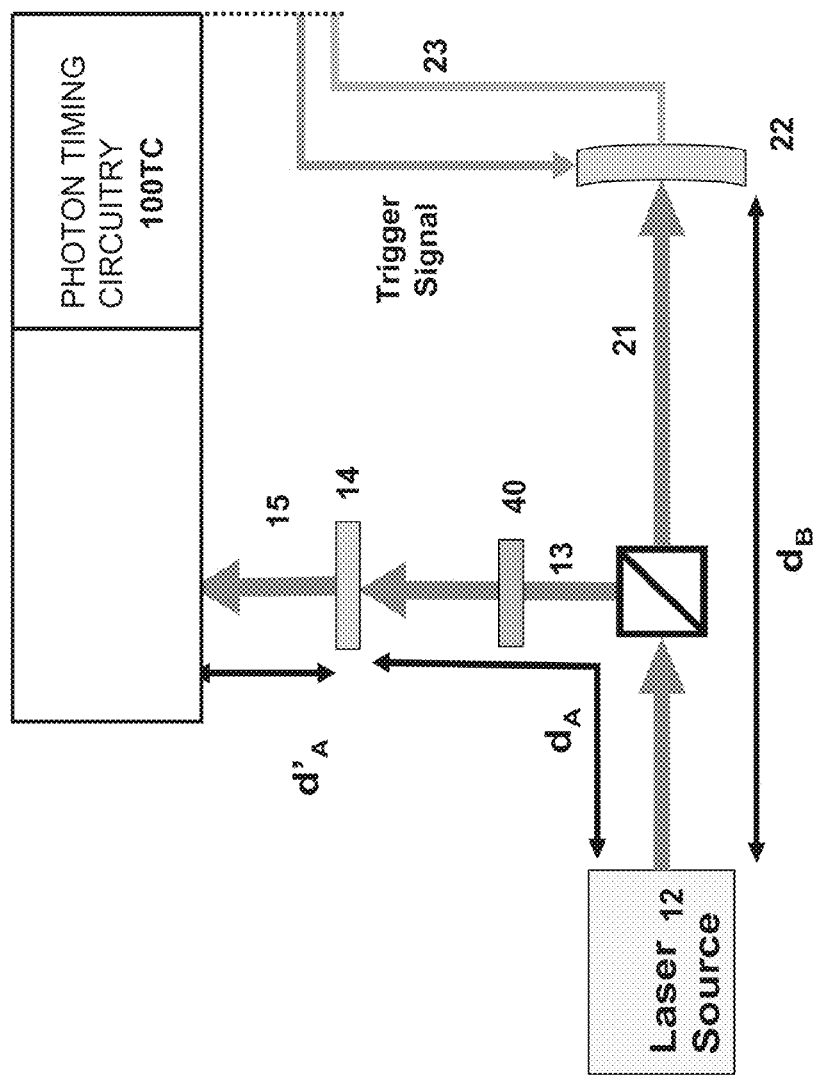
FIG. 8A is an illustrative schematic indicating that a quantum ghost image can be generated if there are phase aberrations in a path, using either transmitted or reflected photons.

FIGS. 8A and 8B depict an inventive ghost imaging system in which the object is a semi-opaque mask 14' providing a transmissive photon output 46 to reach the bucket detector 16. In FIG. 8B, the mask 14' is a stencil of the letters "ARL". The detector 22 in this regime of FIGS. 8A and 8B is a two-dimensional charge couple device array that provides two-dimensional speckle data as the spatially addressable intensity values 23 to the computer 18 with gated electrical values being communicated to the computer 18 with gated exposure start and stop triggers being communicated to the detectors 16 and 22. The object 14' is located a distance $d'_A$ from the bucket detector 16.

In accordance with a preferred embodiment, as depicted in FIG. 8B, the laser source 12 in conjunction with the rotating phase screen diffuser 40, emits light uncorrelated in space and time. Thus, the speckle images 23 are random distributions in space and time. The beam splitter 28 essentially "halves" the intensity of the initial speckle image from diffuser 40 and splits it into two different paths (21 and 13) as shown in FIG. 8B. Spatially correlated means that correlations are present at any given instant of time between the two paths 13, 21. There will be a point to point correlation between the speckle images on each path, although paths are spatially distinct. The coincidence detection by the processor 18 is temporal; i.e. correlated at specific time intervals. "Correlation" or "Correlated," as used in the present application, means a logical or natural association between two or more paths; i.e., an interdependence, relationship, interrelationship, correspondence, or linkage. For example, the present invention may be used in conjunction with sunlight, an incoherent light source, whereby a first and second plurality of photons are emitted from the sun at the same time. If the first detector is located on the earth (ground) receives the first plurality of photons, and the second detector located in space (such as in a satellite orbiting the earth) receives a second plurality of photons, the time intervals need to be synchronized; i.e., a first plurality of photons which strikes the ground object is correlated with a second plurality of photons detected in space at synchronized timing intervals. It can be readily appreciated by those skilled in the art that if the detected samples from the first and second plurality of photons are not part of the correlation, it will not contribute to the $G^{(2)}$ image as mathematically described in the above equations. Further, coincidence has to do with two measurements at the same or approximately the same time. For example, when a coincidence occurs, one must compensate for the media involved to take into account the variation in particle velocity between different media.

FIG. 9 is a perspective schematic of a reflective ghost imaging scheme using light emitting diodes as a representative incoherent light source in a field setting and insensitive to transmission through obscuring medium.

Figure 10:
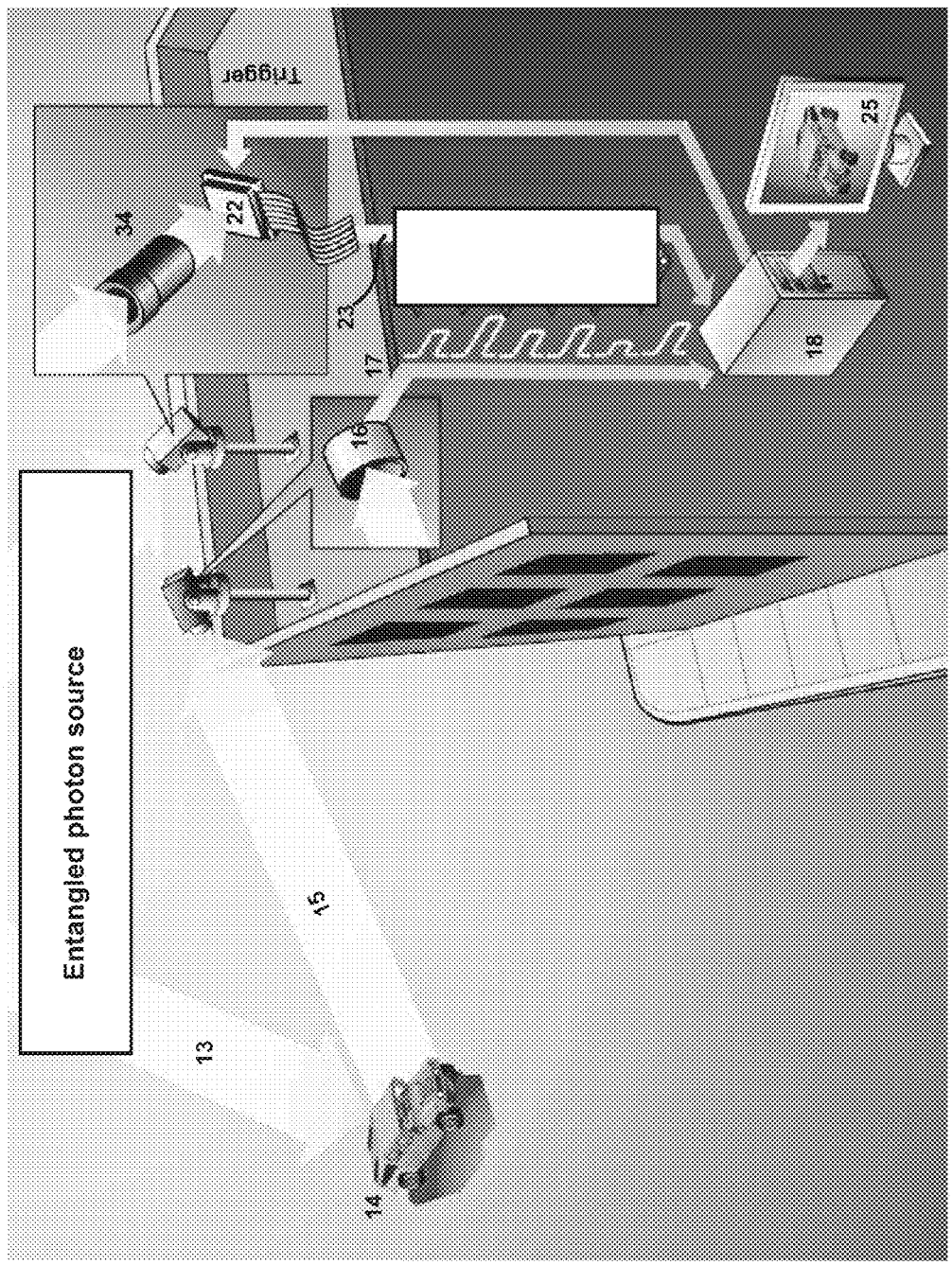
FIG. 10 is a perspective schematic view of the reflective ghost imaging scheme using solar light reflected from an object, depicted as a vehicle.

FIG. 10 is a perspective schematic of a reflective ghost imaging scheme using solar radiation as a light source. With insensitivity to obscuring medium. While FIG. 10 depicts an object 14 as a vehicle in a land setting with elevated position detectors 16 and 22, it is appreciated that the system is operative underwater and in other configurations.

Figure 11:
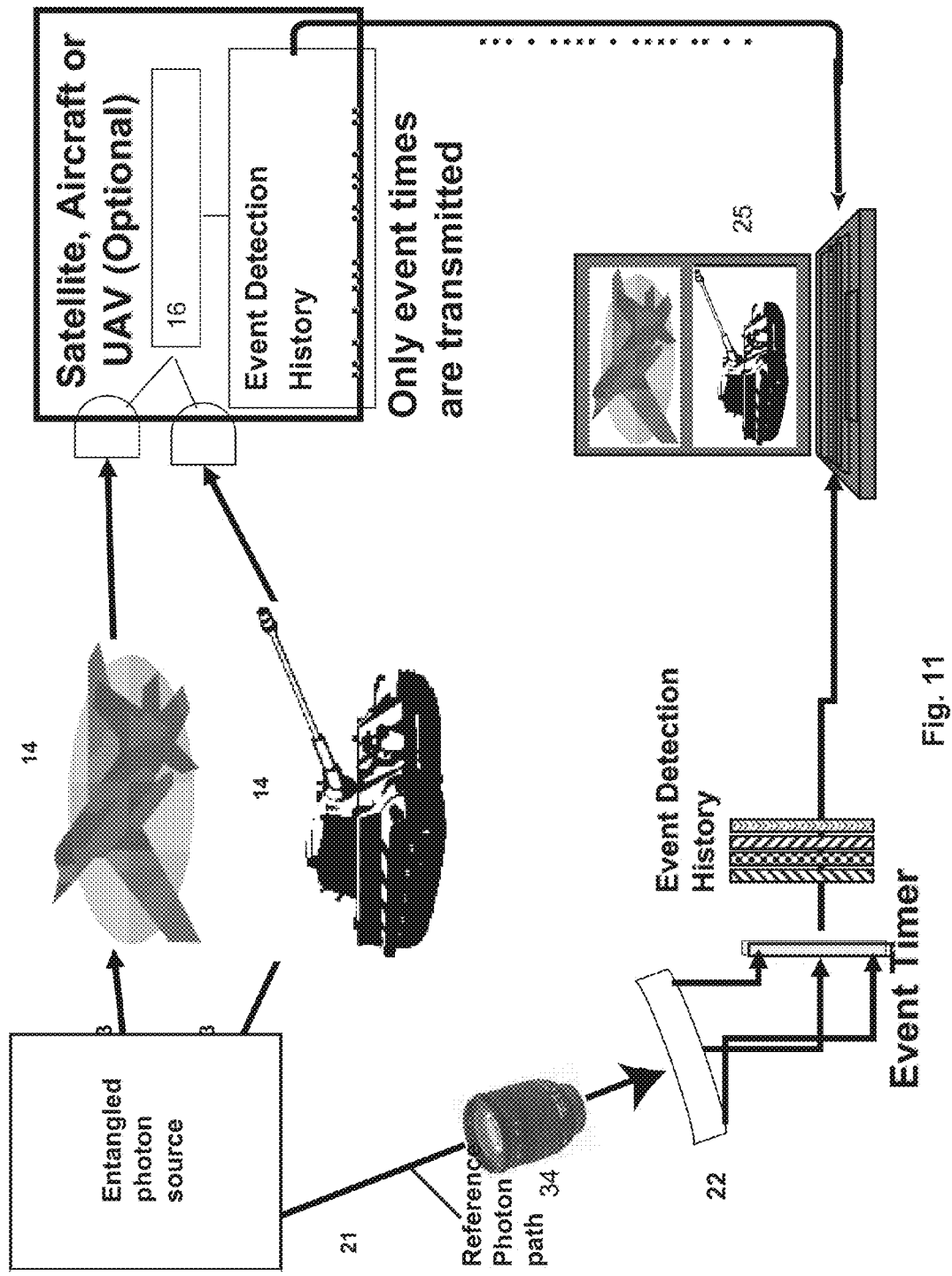
FIG. 11 is a diagram depicting the multiple object imaging qualities of the inventive quantum ghost imaging scheme operating with entangled or thermal photons protocol.

FIG. 11 is a diagram depicting multiple object imaging qualities of an inventive ghost imaging scheme operating with entangled or thermal photon protocols using solar radiation and with transmission from one or more detectors 16 or 16' to only transmit event detection history indicative of movement within an observation field according to selected detection parameters such as transit speed, vehicle size, or a combination thereof.

Figure 12:
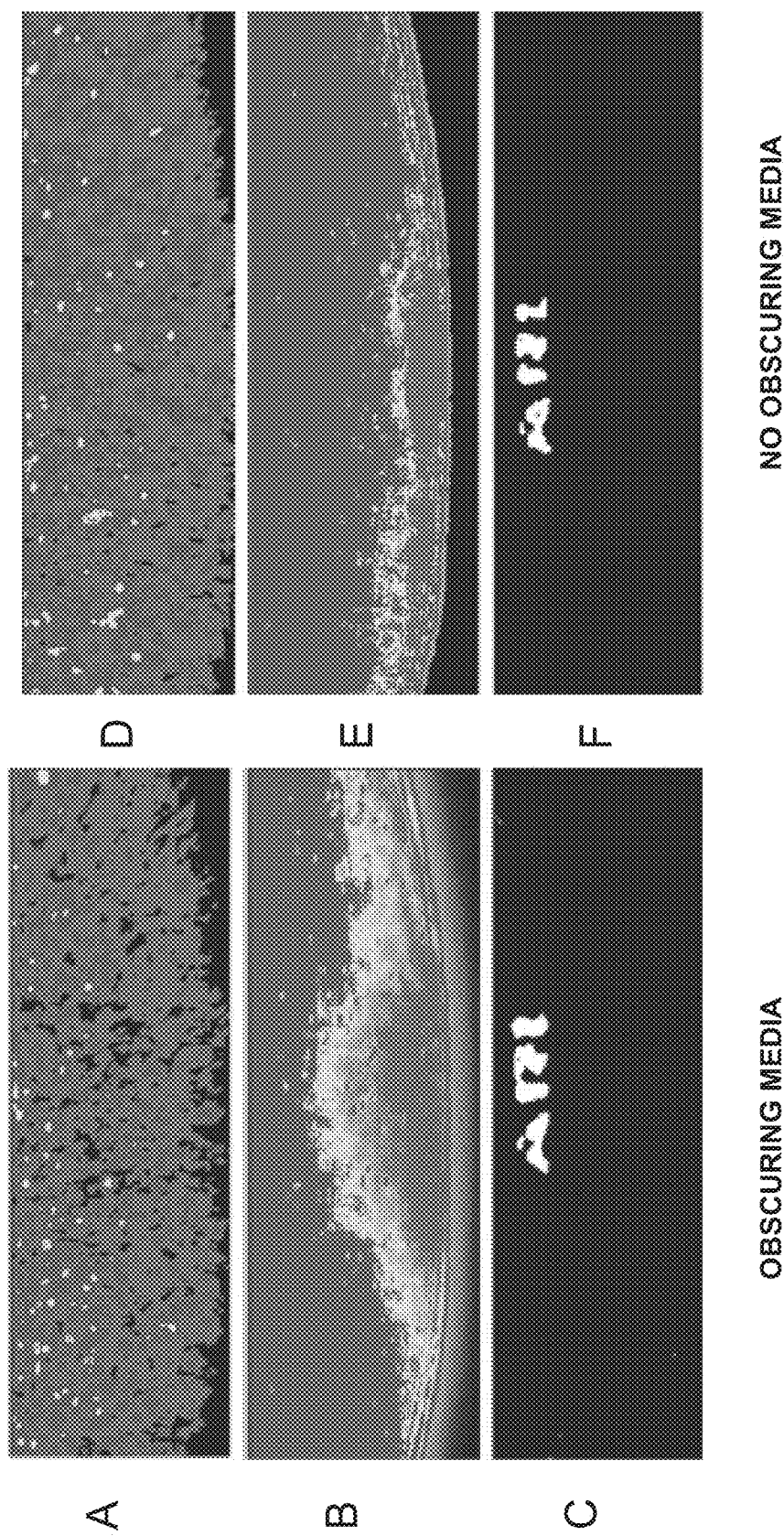
FIG. 12 is a set of images depicting the results of a reflection ghost imaging experiment wherein the light path to the bucket detector passes through an obscuring medium.

To confirm the ability to generate a ghost image of an object through an obscuring medium, an obscuring medium of frosted glass is inserted along the optical path 15 of FIG. 5A. FIG. 12A is an instantaneous image of the light source 12 collected on the detector 22. FIG. 12B is an averaged image of the light source 12 obtained from detector 22 on averaging of 100 such images according to FIG. 12A. FIG. 12C is a $G^{(2)}$ image of the object obtained by correlation to photon ghost imaging from signals 17 and 23. The instantaneous image of the obscured reflection object 14 is provided in FIG. 12D while the averaged image of the obscured reflection object 14 is provided in FIG. 12E and substantially corresponds to that depicted in FIG. 7D.

FIG. 13 is a further description of a preferred embodiment utilizing a broadband entangled photon source 12EP, from which light of various wavelengths is emitted in pairs. The light beam enters beam splitter 28 wherein one part of the entangled photon pair enters path 13 (to the object) and the other part of the photon pair enters path 21 to the detector 22. The target has an influence on the photon and acts to make a measurement or partial measurement on it such that a preponderance of measurements are in one type of outcome (say for example a color) may be performed. The other reference or kept photon which enters path 21 is measured and is found to have the conjugate property (for example, a conjugate color). Besides color, polarization techniques could be utilized as described in U.S. patent application Ser. No. 10/900, 351, herein incorporated by reference. The stream of such entangled photons is generated and a ghost image is formed by weighting the referenced entangled photon with the, for example color, measurements. Optionally, this system may be utilized, for example, in conjunction with a spectrometer system 35S. Assuming that the target object 14 absorbs certain wavelengths of light, and the light which is reflected back via path 15 will be missing the absorbed wavelengths. In this example, by connecting path 21 to a photo counting spectrometer system 35S, it will process coincidences between what is reflected from object 14 and that which the spectrometer system 35S detects. From this correlation, one can determine by "dips" in coincidence measurement, the wavelengths which are absorbed by the object. By determining spectrographic information relating to different objects, one can determine the nature of the object and certain properties about its chemical composition. Using this preferred embodiment, both the image and spectrographic information is obtainable. Thus, what is not received back is as informative as that which is reflected. For example, if the target is wearing an infrared absorbing uniform, the interaction of the initial light beam 13 with the target 14 may contain infrared light which is not absorbed by target 14. One can then distinguish as whether or not a person is wearing infrared absorbing clothing from measuring the intensity of the reflected light at bucket detector 16. Such information can be used for identification of groups of individuals. Consequently, absorption profiles of different peoples may be maintained in absorbent, florescent, or transmission spectral databases. Furthermore, a system of this type provides an easy way to generate so-called multispectral images.

An embodiment in U.S. application Ser. No. 10/900,351 describes a light source emitting radiation that may be one of an entangled, thermal, or chaotic light source. The photons from the light source may be divided into two paths: one path for the object to be imaged, and the other path in which images of the entangled, thermal, or chaotic light are measured independent of interaction with the objects. Any or all paths may pass through an obscuring medium. The measurements of the entangled, thermal, or chaotic light may then stored for future processing. The light in the object path is collected into a bucket detector and measured. The measurements of the bucket detector are then stored for future processing. A process for solving for the $G^{(2)}$ Glauber coherence between the two paths is provided to reconstruct the image. The $G^{(2)}$ Glauber coherence between the two paths is used to generate a correlation two-photon ghost image.

Moreover, in contrast to conventional reflective object imaging, the imaging referred to as a photon ghost image is capable of being substantially independent of image distortion associated with photon transit through obscuring media and practically has only nominal image distortion associated with light in ghost imaging system operating in an obscuring medium. Representative obscuring media illustratively include fog, an aerosol, particulate whether suspended in air, water, or vacuum media; turbulence; liquid or frosted glass. For example, if the target object is a red chair that is illuminated by entangled white light photons, then all light except for red will be absorbed. At the charged coupled device (CCD) (or CMOS), the conjugate of the red will appear. There will be less red on the CCD in the region of the chair due to the conjugate. It will be recognized that for measurements of various photons or other quantum particles, the detection apparatus/equipment must be suited to their measurement and the circumstances of the measurement. For example, instead of a CCD or CMOS, a neutron detector or quantum particle scanner can be utilized.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The foregoing description is illustrative of particular embodiments of the invention, but is not meant to be a limitation upon the practice thereof. The following claims, including all equivalents thereof, are intended to define the scope of the invention. As used in the following claims, the term "processor" means one or more processing units, central processing units, processor cores, microprocessors, digital signal processors, multiprocessors, computers, and/or controllers, which may be connected together or to other circuitry in a manner known to those of ordinary skill in the art. As used in the foregoing claims, the term "subject" includes object(s), area, person(s), setting, place, mask, or scene.

The numbers in the drawing FIGS. represent the following elements in the drawing FIGS.

Number Key

| | |
|---|---|
| Random, spatially correlated light source | 12 |
| light source output | 13 |
| Object | 14 |
| semi-opaque mask | 14' |
| Reflected light from object (14) | 15 |
| bucket detector | 16 |
| Second bucket detector | 16' |

| -continued | |
|---|---|
| Detector (16) electrical signal | 17 |
| Detector (16') electrical signal | 17' |
| Computer | 18 |
| light source output | 21 |
| a spatially addressable detector | 22 |
| Detector (22) electrical signal | 23 |
| Monitor | 25 |
| beam splitter | 28 |
| lens | 34 |
| beam splitter | 38 |
| phase screen | 40 |
| Monochromometer | 44 |
| transmissive photon output | 46 |

What is claimed is:

1. A system for detecting information concerning a subject comprising;
  a processor for processing information;
  at least one entangled photon light source;
  a splitter for splitting the entangled photons into first and second parts, the first parts being directed to a subject at a first location and the second parts being directed to a receiver at a second location;
  the receiver at the second location being operatively connected to the processor; the receiver at the second location operative to receive the second parts and detect spatial information relating to the influence of the subject on the first parts based upon the second parts;
  a timer for measuring the time of travel for the second parts from the light source to the receiver at the second location;
  the processor operating to correlate the time of travel of the second parts with the spatial information derived from the receiver at a correlating interval of time to detect the subject at the first location.

2. The system of claim 1 wherein the presence or absence of a subject is determined using the measurement of the second parts at synchronized time intervals by using the equation:

$$G^{(2)}(\vec{\rho}_o, \vec{\rho}_i) = G_{11}^{(1)}(\vec{\rho}_1, \vec{\rho}_1) G_{22}^{(1)}(\vec{\rho}_2, \vec{\rho}_2) + G_{12}^{(1)}(\vec{\rho}_1, \vec{\rho}_2) G_{21}^{(1)}(\vec{\rho}_2, \vec{\rho}_1)$$

where $G_{11}^{(1)} G_{22}^{(1)}$ is approximately equal to $G_0$ and $G_0$ is a constant, and $G_{12}^{(1)} G_{21}^{(1)}$ is approximately equal to $\delta(\rho_1 \pm \rho_2)$ where $\delta(\rho_1 \pm \rho_2)$ represents the $\delta$-function non-local position-position correlation; and $\rho_1$ and $\rho_2$ are the transverse spatial vector coordinates of the object and the detector used for measuring the second parts, respectively, and where the effect of the object at $\rho_1$ is derived from the ratios and/or differences and/or products and sums of the photon properties measured at $\rho_2$ in lieu of recorded measurements in the terms $G_{11}^{(1)}$ and $G_{12}^{(1)} G_{22}^{(1)}$ at location $\rho_1$.

3. The system of claim 1 wherein the splitter comprises a beam splitter and wherein the properties of the entangled photons generated by the at least one entangled photon light source includes two different colors which are superimposed in each of said first and second parts such that the influence of an object in the subject location on the first parts will result in the conjugate color being detected by the receiver.

4. The system of claim 1 wherein the properties of the entangled photons generated by the at least one entangled photon light source includes two different polarizations which are superimposed in each of said first and second parts such that the influence of an object in the subject location on the first parts will result in the conjugate polarization being detected by the receiver.

5. The system of claim 1 wherein the properties of the entangled photons generated by the at least one entangled photon light source includes two different spins which are superimposed in each of said first and second parts such that the influence of an object in the subject location on the first parts will result in the conjugate spin being detected by the receiver.

6. The system of claim 1 wherein the properties of the entangled photons generated by the at least one entangled photon light source includes two different angular momenta which are superimposed in each of said first and second parts such that the influence of an object in the subject location on the first parts will result in the conjugate angular momentum being detected by the receiver.

7. The system of claim 1 wherein the splitter is a 50/50 beam splitter which splits the second parts into a nonpolarizing beam splitter, which directs certain of the second parts into a charged coupled device and the remainder into a dichroic beam splitter which splits the second parts into two color bucket detectors.

8. The system of claim 1 wherein the second location is remote from the subject and wherein the second portions are used to generate an image of the subject.

9. The system of claim 1 wherein the properties of the entangled photon parts are affected by the subject; and wherein the influence of the subject on the first parts will result in the conjugate quantum characteristic being detected by the receiver.

10. The system of claim 1 wherein the entangled photon parts which are received into the receiver never directly interact with the subject yet are determinative of whether or not the properties of the entangled quantum particles are affected by the subject.

11. The system of claim 1 wherein the first parts travel though an obscuring medium such as fog, an aerosol, gas, particulate, turbulence, liquid, or frosted glass en route to the first location and wherein the subject is observed through the obscuring medium based upon quantum characteristics recorded by the receiver.

\* \* \* \* \*